(12) United States Patent
Mackraz

(10) Patent No.: US 10,027,888 B1
(45) Date of Patent: Jul. 17, 2018

(54) DETERMINING AREA OF INTEREST IN A PANORAMIC VIDEO OR PHOTO

(71) Applicant: Amazon Technologies, Inc., Seattle, WA (US)

(72) Inventor: James Domit Mackraz, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 327 days.

(21) Appl. No.: 14/867,388

(22) Filed: Sep. 28, 2015

(51) Int. Cl.
| | |
|---|---|
| *H04N 5/00* | (2011.01) |
| *H04N 5/232* | (2006.01) |
| *G06K 9/00* | (2006.01) |
| *G06K 9/32* | (2006.01) |
| *H04N 13/04* | (2006.01) |
| *H04N 13/383* | (2018.01) |

(52) U.S. Cl.
CPC ..... *H04N 5/23238* (2013.01); *G06K 9/00221* (2013.01); *G06K 9/00604* (2013.01); *G06K 9/3241* (2013.01); *H04N 13/0484* (2013.01); *H04N 13/383* (2018.05)

(58) Field of Classification Search
CPC .......... H04N 5/23238; H04N 13/0484; G06K 9/00221; G06K 9/3241
USPC .......................................... 348/36
See application file for complete search history.

(56) References Cited

U.S. PATENT DOCUMENTS

| | | | |
|---|---|---|---|
| 9,213,163 B2* | 12/2015 | Lewis | G02B 7/12 |
| 2009/0022368 A1* | 1/2009 | Matsuoka | B60K 35/00 |
| | | | 382/103 |
| 2012/0249741 A1* | 10/2012 | Maciocci | G06F 3/011 |
| | | | 348/46 |

* cited by examiner

*Primary Examiner* — Jeffery Williams
(74) *Attorney, Agent, or Firm* — Pierce Atwood LLP

(57) ABSTRACT

A system and method for identifying an interesting area within video data using gaze tracking is provided. The system determines gaze vectors for individual faces and determines if the gazes are aligned on a single object. For example, the system may map the gaze vectors to a three-dimensional space and determine a point at which the gaze vectors converge. The point may be mapped to the video data to determine the interesting area having a high priority. The system may generate a heat map indicating gaze tracking over time to delineate persistent interesting areas and instantaneous interesting areas.

22 Claims, 30 Drawing Sheets

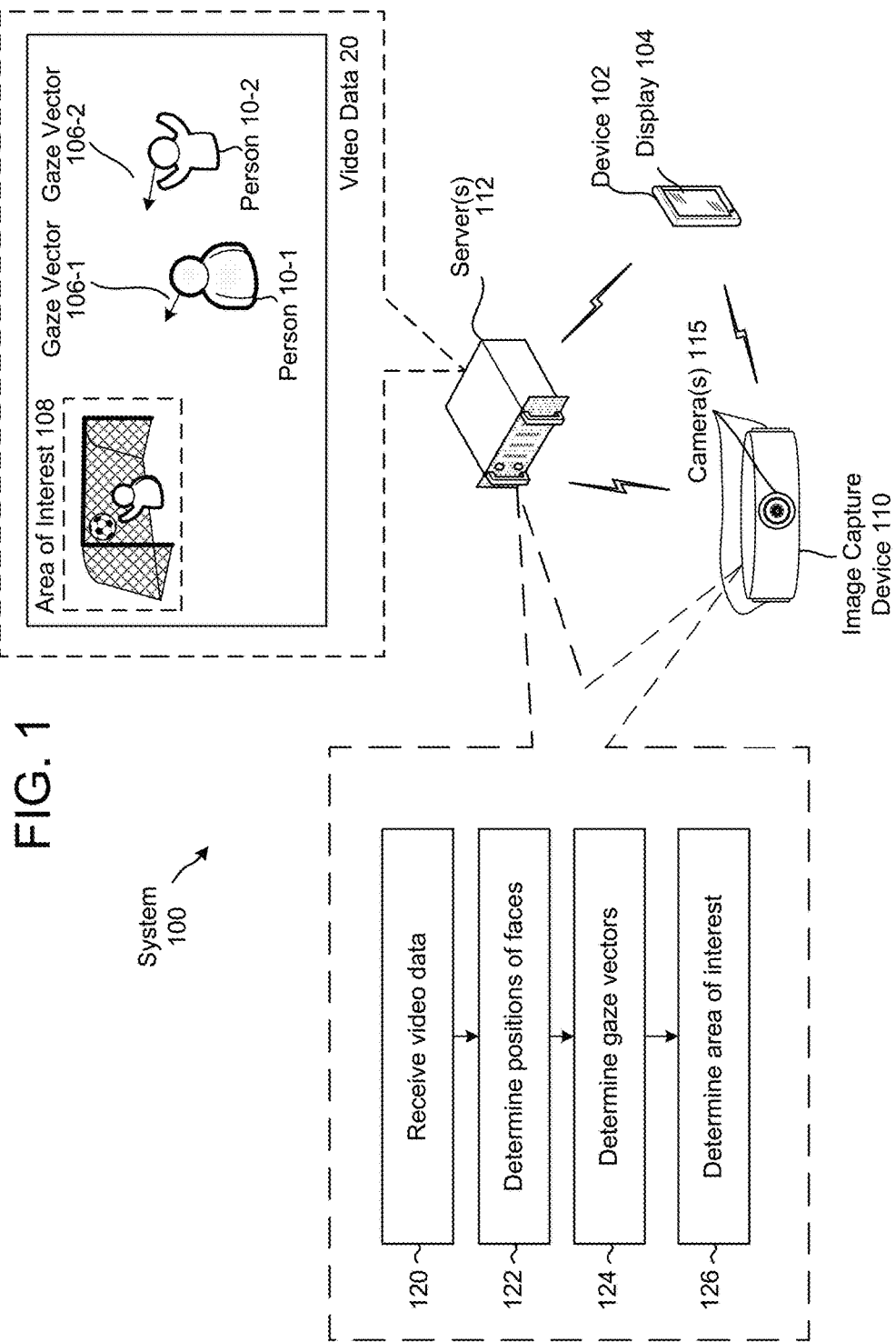

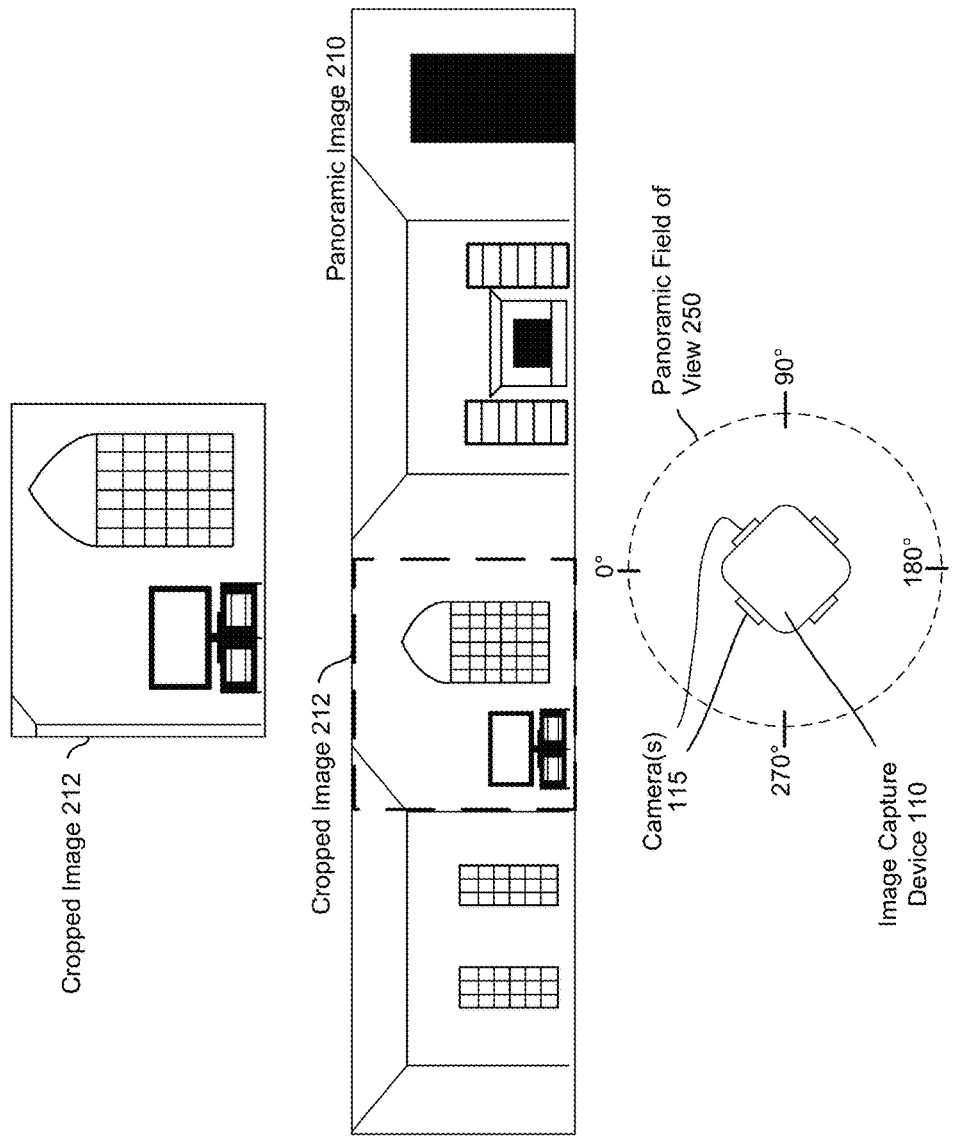

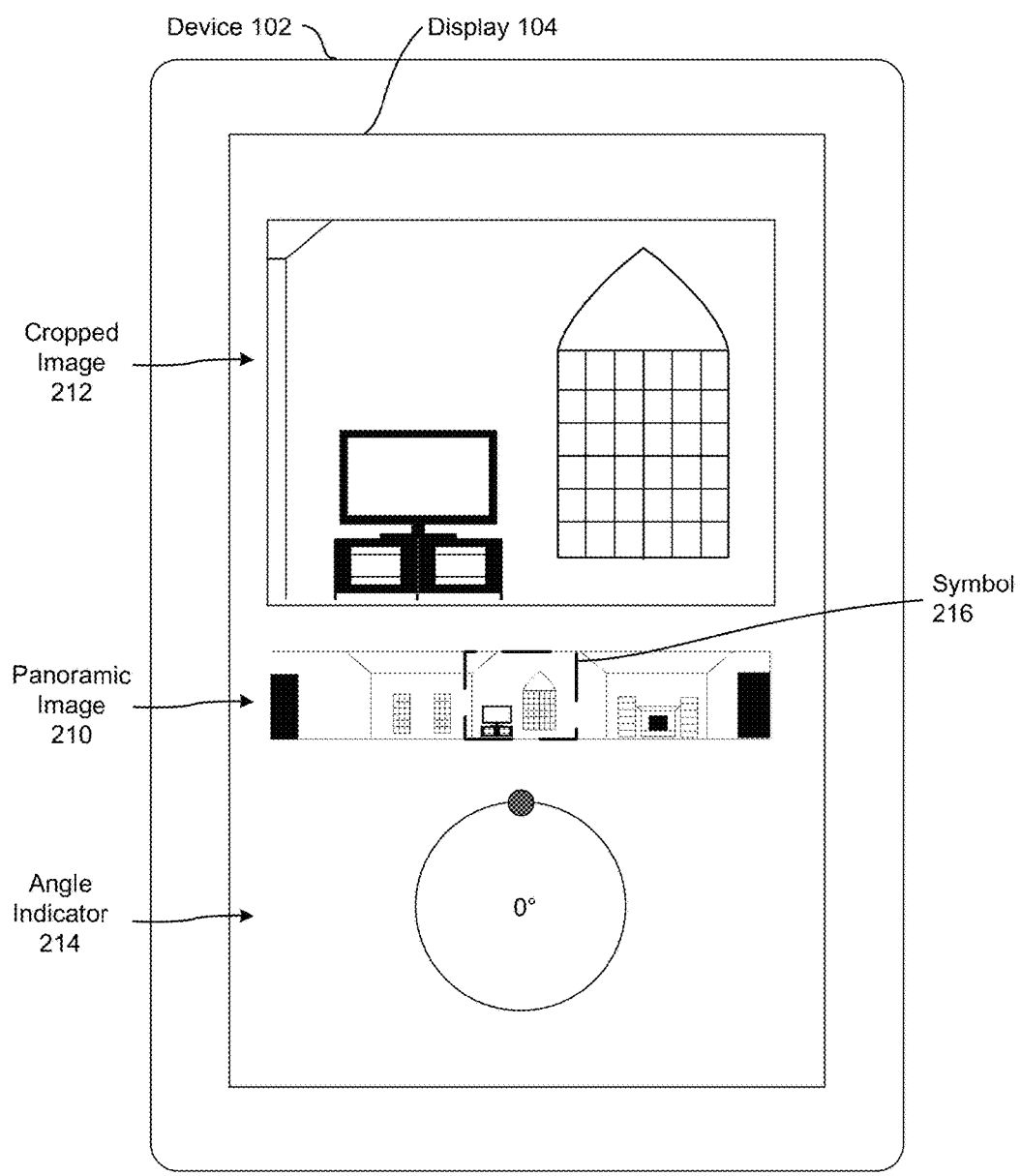

FIG. 3
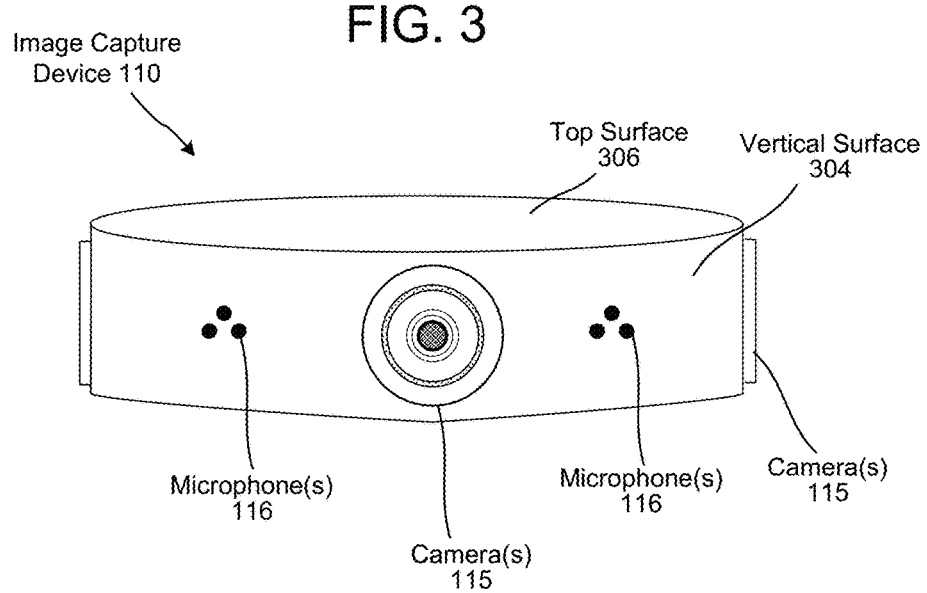
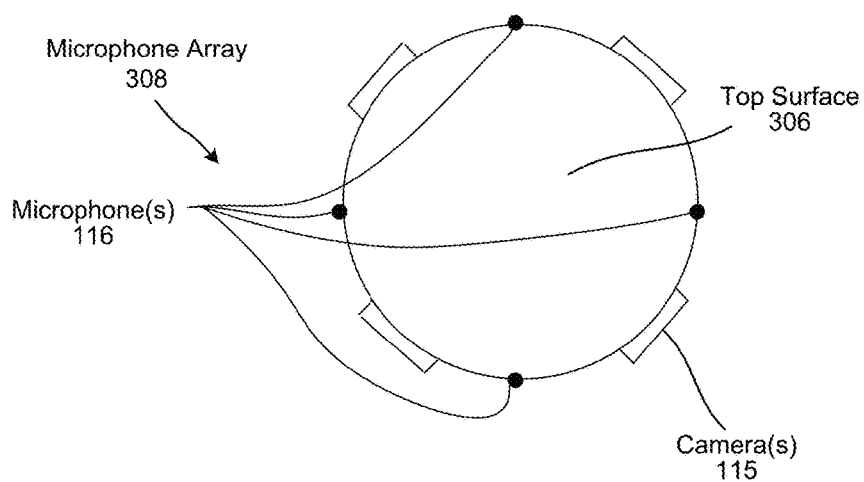

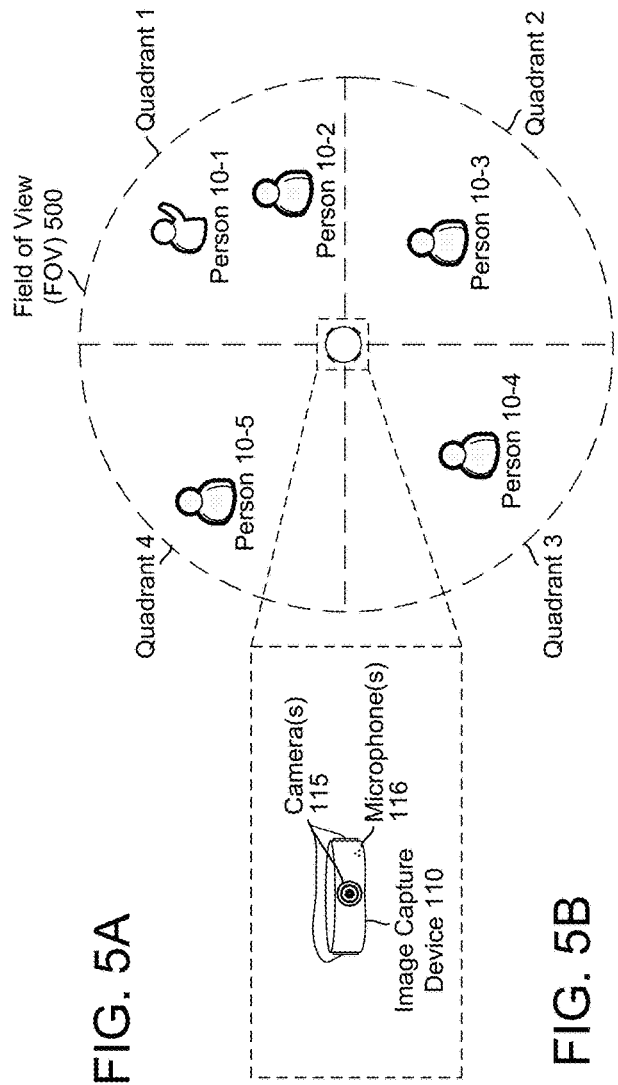
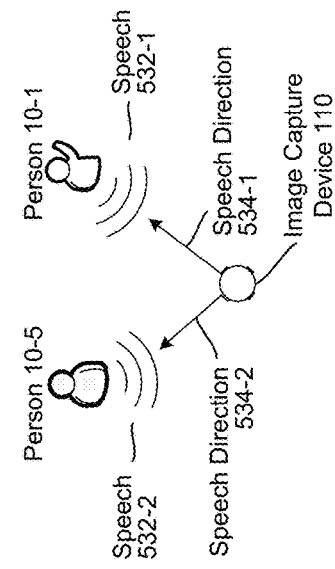
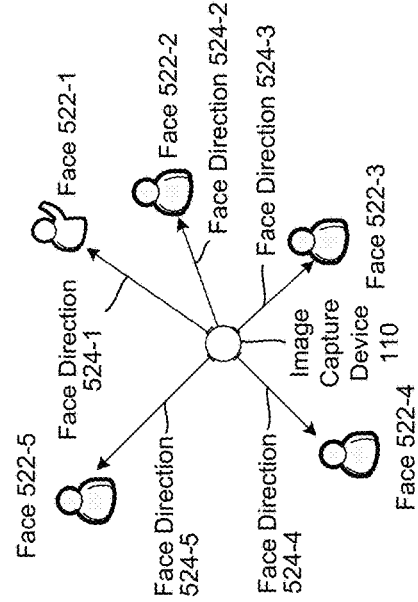
FIG. 5A
FIG. 5B
FIG. 5C

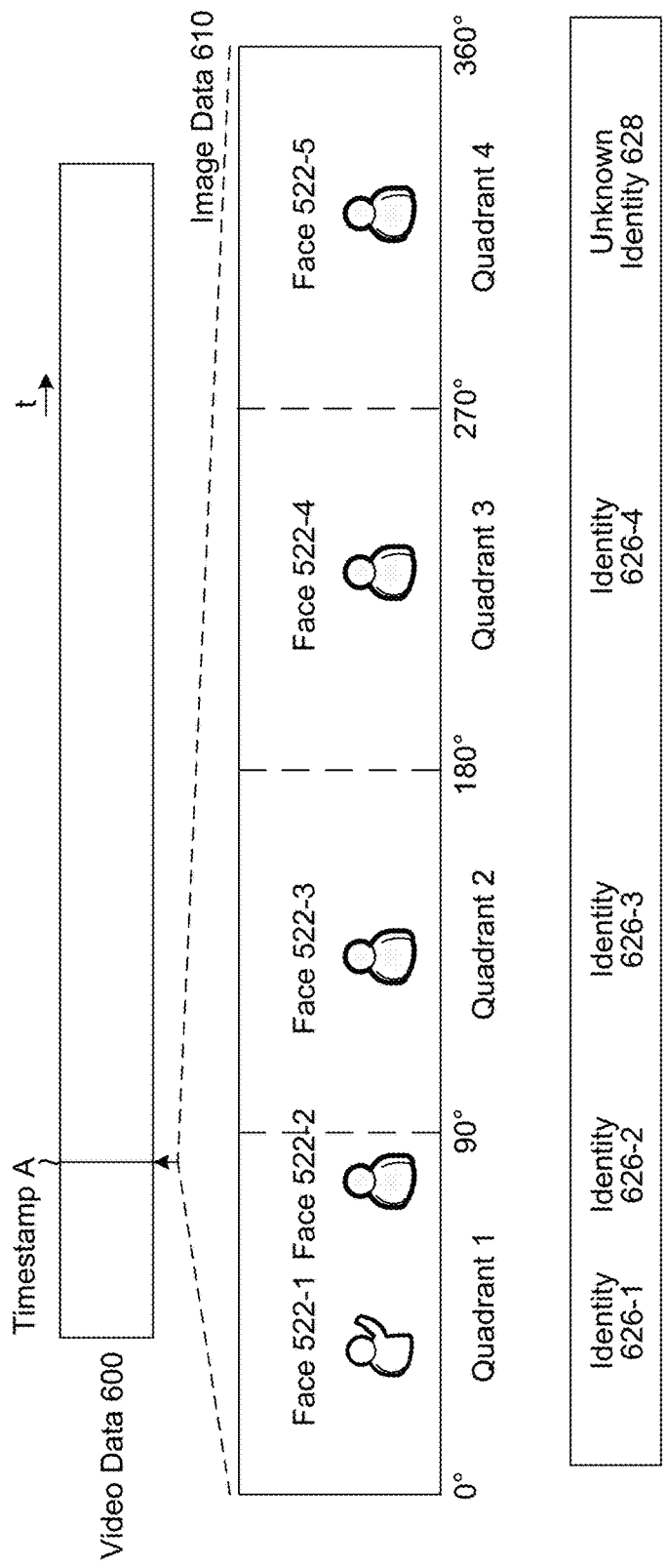

FIG. 8A
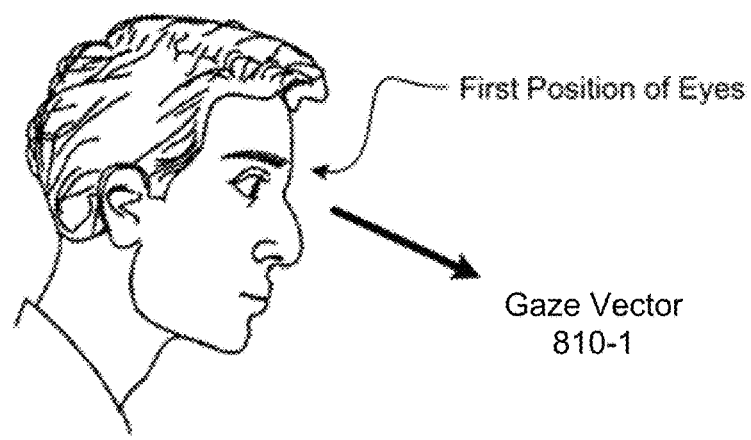
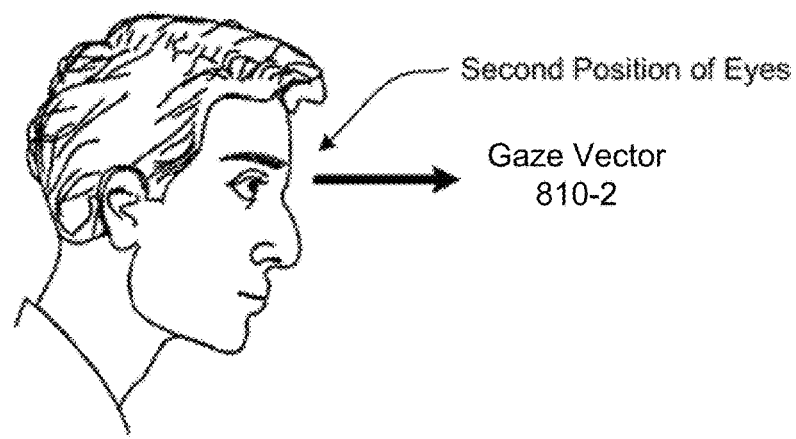

FIG. 8B
Example 802-1
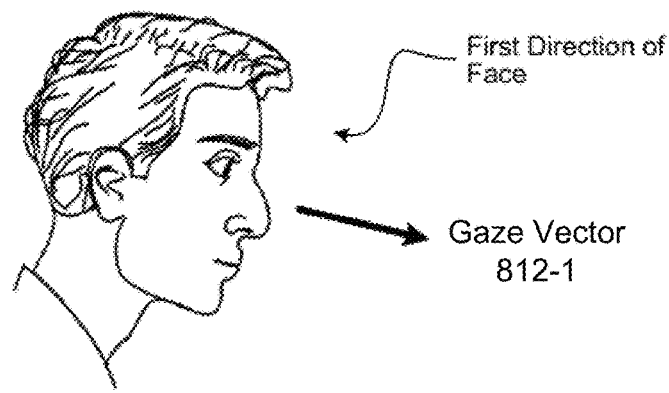
Example 802-2
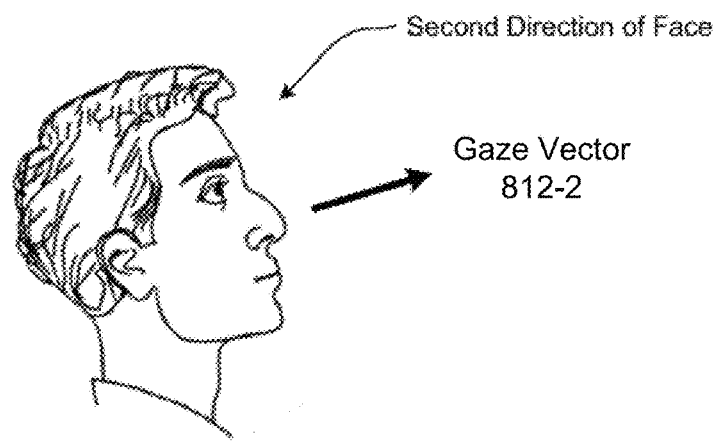

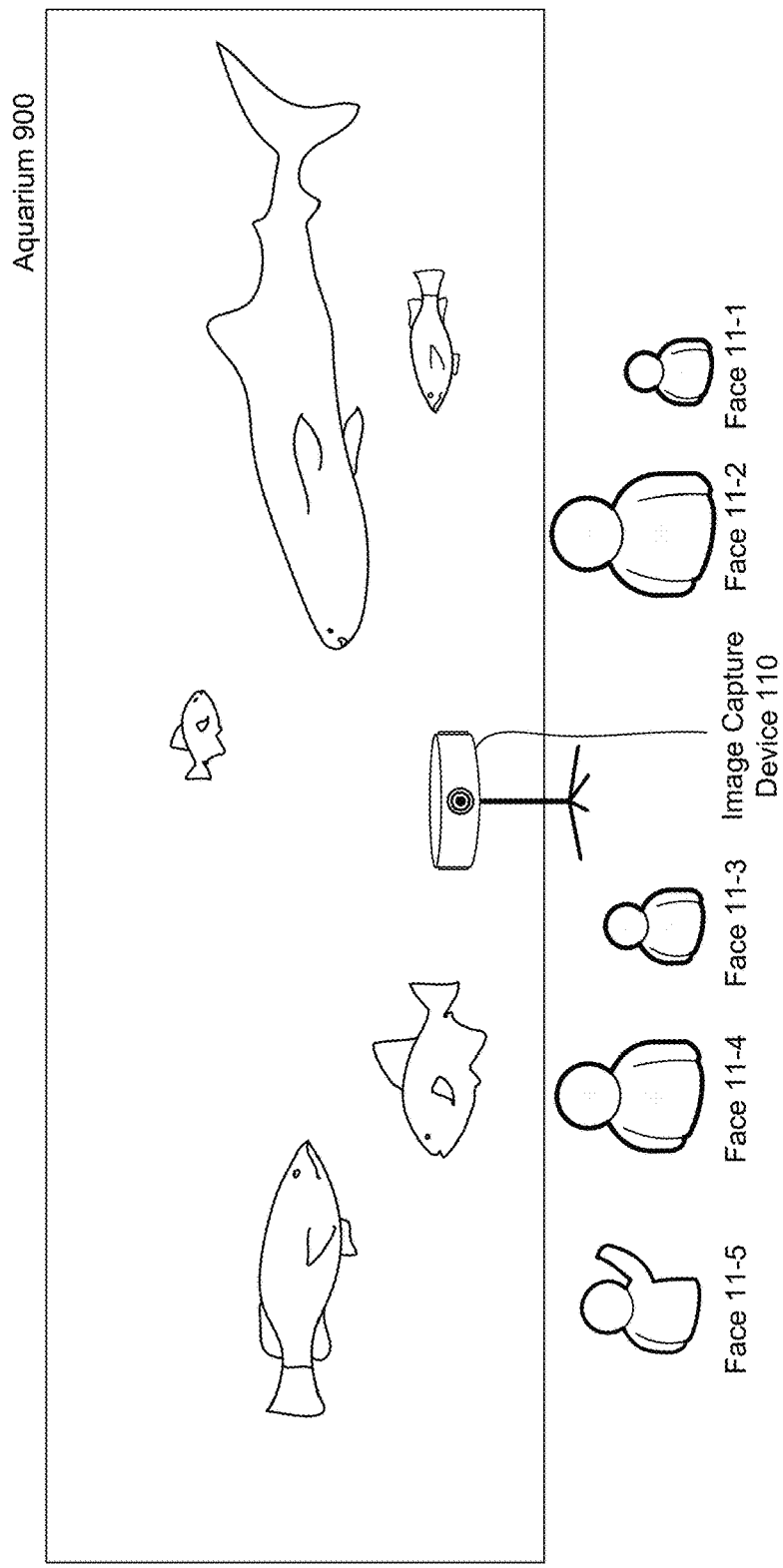

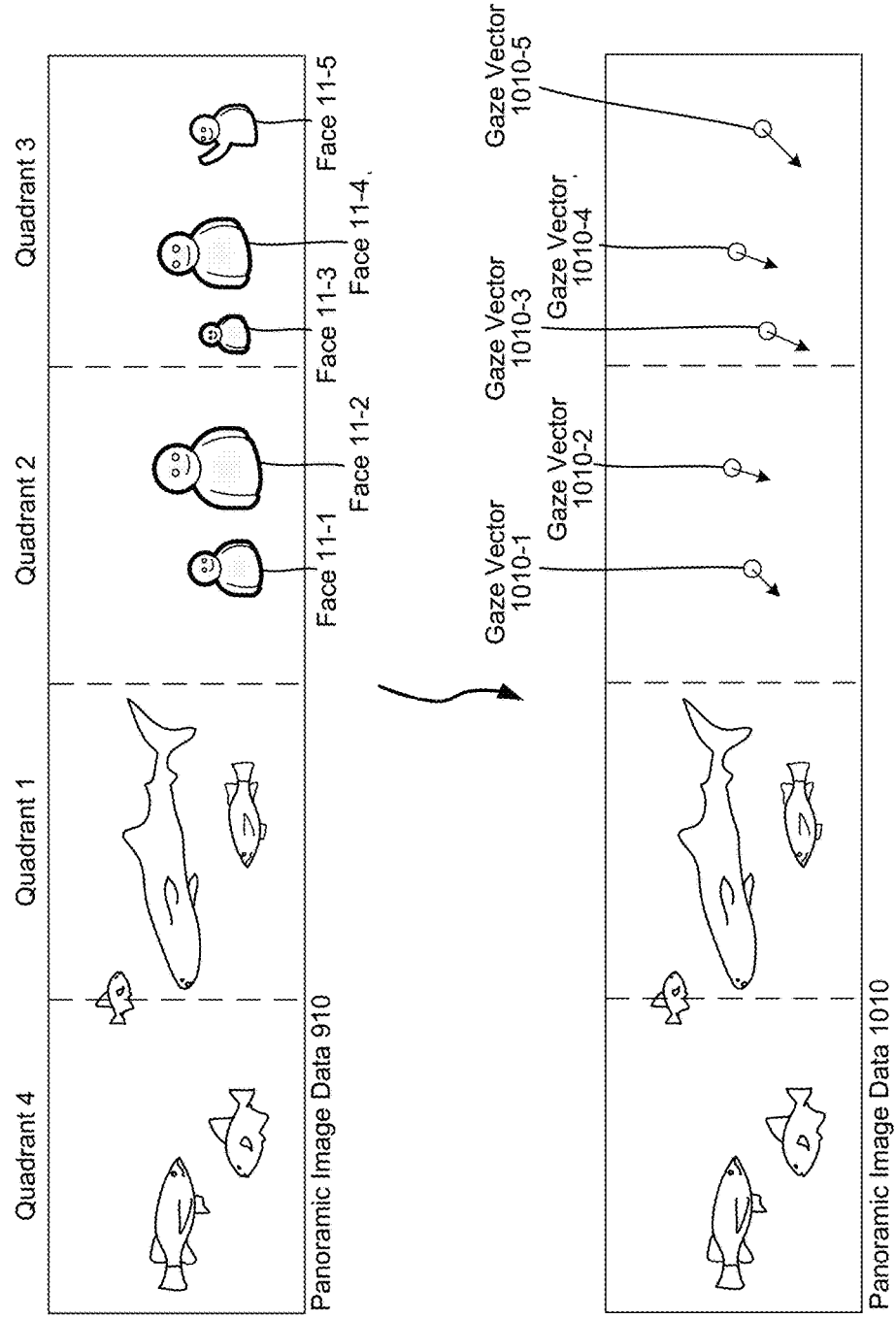

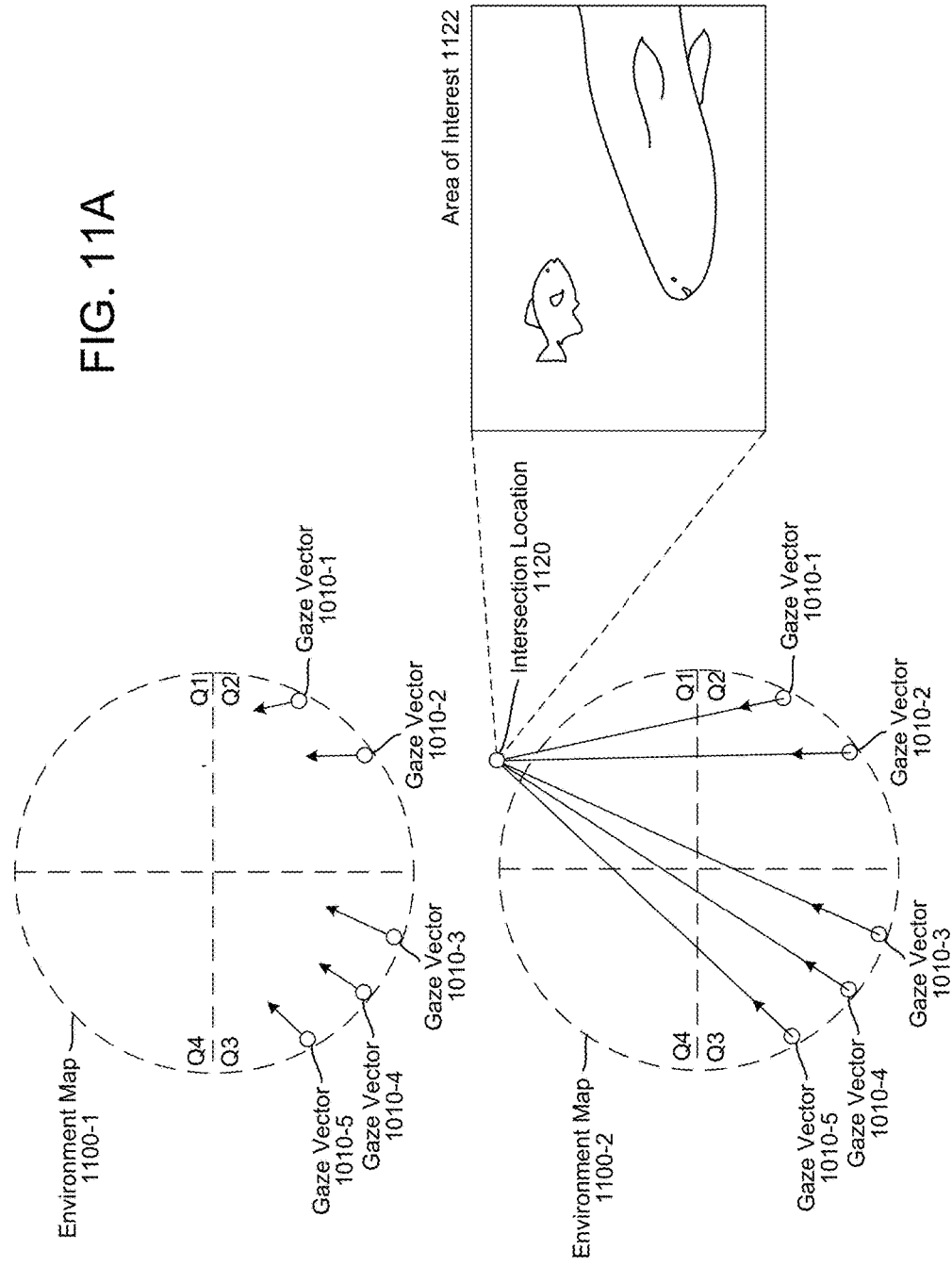

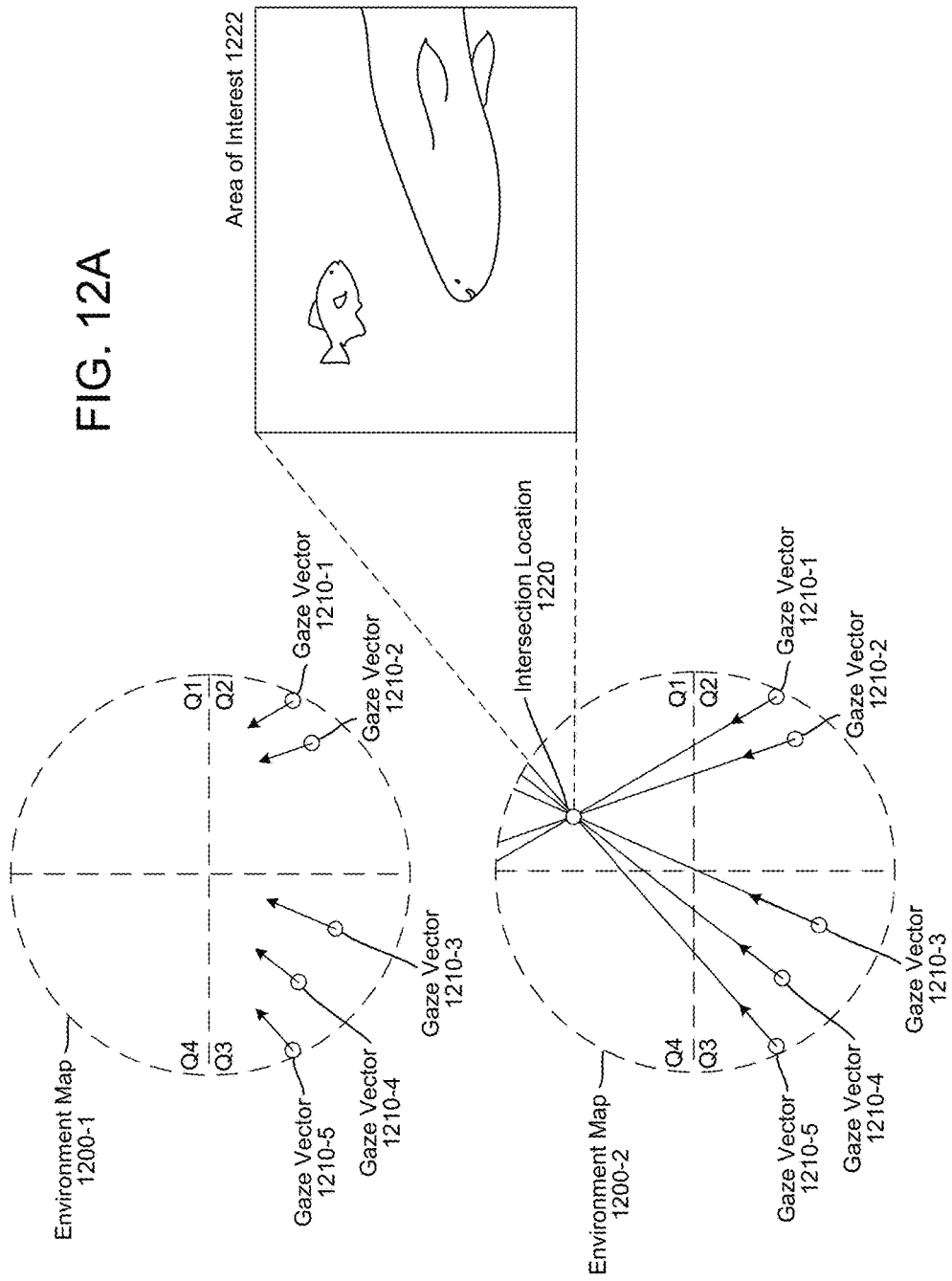

DETERMINING AREA OF INTEREST IN A PANORAMIC VIDEO OR PHOTO

BACKGROUND

With the advancement of technology, the use and popularity of electronic devices has increased considerably. Electronic devices are commonly used to capture videos. These videos are sometimes shared with friends and family using online systems, including social networking systems. Disclosed herein are technical solutions to improve how the videos are generated.

BRIEF DESCRIPTION OF DRAWINGS

For a more complete understanding of the present disclosure, reference is now made to the following description taken in conjunction with the accompanying drawings.

FIG. 1 illustrate overviews of systems for implementing embodiments of the present disclosure.

FIGS. 2A-2B illustrate examples of a panoramic image, a cropped image and a user interface including an angle indicator according to embodiments of the present disclosure.

FIG. 3 is an illustration of an audio component that may be used according to embodiments of the present disclosure.

FIGS. 5A-5C illustrate examples of determining directions of faces and speech according to embodiments of the present disclosure.

FIG. 6 illustrates an example of determining locations and identities using image data according to embodiments of the present disclosure.

FIGS. 8A-8D illustrate examples of gaze tracking according to embodiments of the present disclosure.

FIGS. 9A-9C illustrate an example of capturing panoramic image data according to embodiments of the present disclosure.

FIG. 10 illustrates an example of determining gaze vectors according to embodiments of the present disclosure.

FIGS. 11A-11C illustrate examples of determining intersection locations using gaze vectors in an environment map according to embodiments of the present disclosure.

FIGS. 12A-12B illustrate an example of determining an area of interest using gaze vectors and distance information in an environment map according to embodiments of the present disclosure.

DETAILED DESCRIPTION

Figure 4:
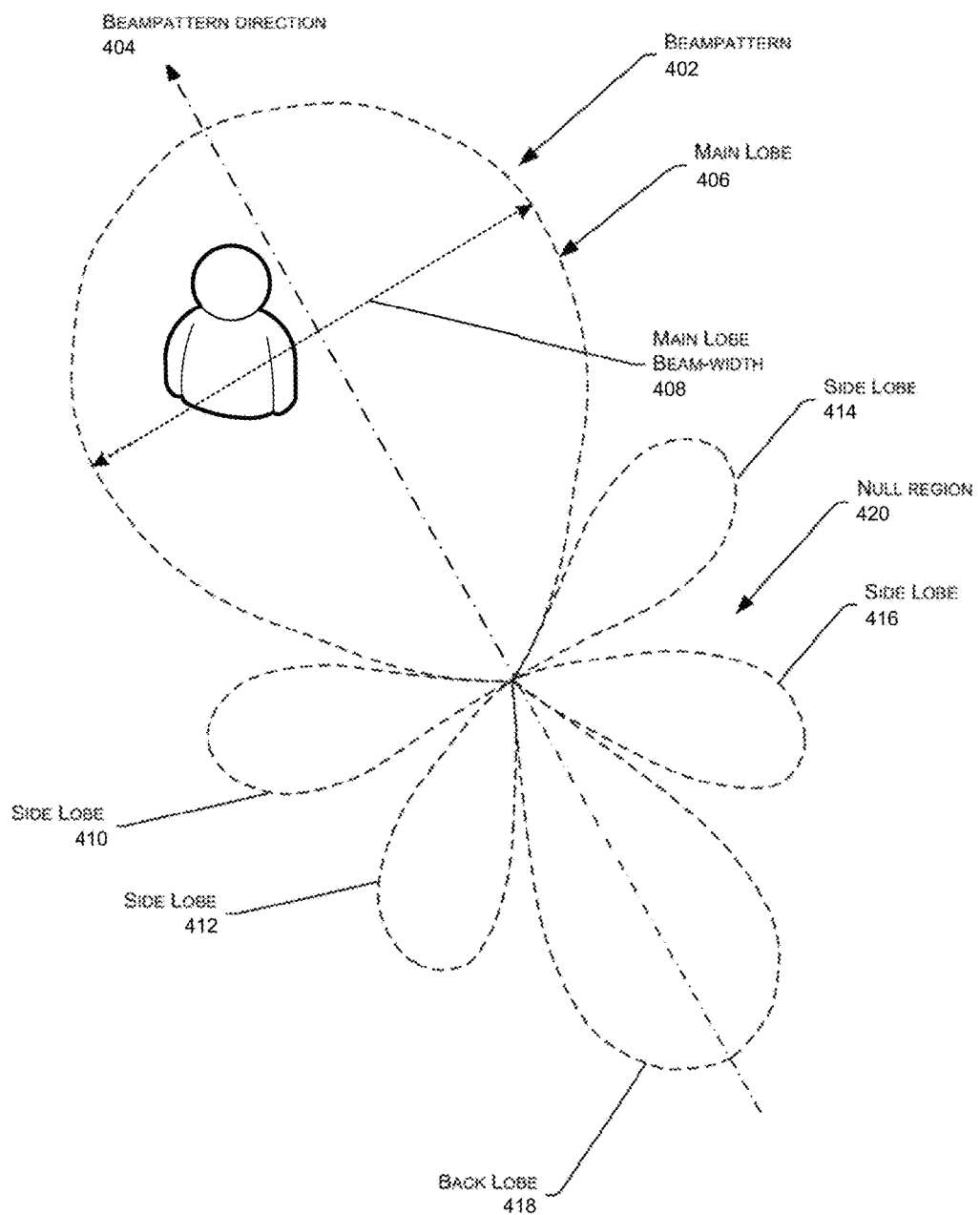
FIG. 4 is an illustration of beamforming according to embodiments of the present disclosure.

Electronic devices are commonly used to capture image/video data using one or more cameras. The device may capture video data including a wide field of view in order to capture a wide area and the video data may be captured over a lengthy period of time. Therefore, the video data may benefit from video editing prior to being displayed and/or shared via social networking. Video editing, such as video summarization, extracting video clips or the like, may be performed automatically without user intervention. However, in some situations, such as video data representing a concert venue, theater production, aquarium or the like, the video editing may include perhaps less interesting portions of the video data (e.g., faces) while omitting more interesting portions of the video data (e.g., the stage, the aquarium, etc.).

To improve results of the video editing process, devices, systems and methods are disclosed that determine interesting areas based on where people represented in the video data are looking. For example, the system may track where people are looking (e.g., gaze tracking) and may determine interesting areas based on where multiple people are looking (e.g., where gazes intersect). The system may track where people are looking using gaze vectors and may determine interesting areas based on an intersection location between the gaze vectors. The interesting areas may correspond to a persistent gaze (e.g., multiple people look at the same location repeatedly over time) or an instantaneous gaze (e.g., multiple people look at the same location at a single point in time). A persistent gaze may correspond to an ongoing event or subject of interest (e.g., band performing at a concert, play being performed on stage, a school of fish, etc.) while an instantaneous gaze may correspond to a rare or sudden occurrence being captured (e.g., surprise cameo or exciting pyrotechnics, a pivotal scene, a dolphin appearing, etc.). The system may generate heat maps based on individual gaze vectors, group gaze vectors, areas of interest or the like to generate additional gaze data.

FIG. 1 illustrates an overview of a system 100 for implementing embodiments of the disclosure. The system 100 includes a device 102 having a display 104, an image capture device 110 and server(s) 112 all in communication with each other. As illustrated in FIG. 1, a first person 10-1 and a second person 10-2 may be represented in video data 20. The server(s) 112 may analyze the video data 20 to determine a first gaze vector 106-1 associated with the first person 10-1 and a second gaze vector 106-2 associated with the second person 10-2. Using the first gaze vector 106-1 and the second gaze vector 106-2, the server(s) 112 may determine an area of interest 108. While the following descriptions (of either FIG. 1 or other figures) may refer to one of the device 102, the image capture device 110 and/or the server(s) 112 performing steps illustrated in the drawings, the steps may be performed by any of the device 102, the image capture device 110 and/or the server(s) 112 without departing from the present disclosure. In addition, the device 102, the image capture device 110, the server(s) 112 or a combination thereof may receive input from a user without departing from the disclosure.

As illustrated in FIG. 1, the server(s) 112 may receive (120) video data (e.g., video data 20) captured by the image capture device 110. The video data may be panoramic video data having a field of view beyond 180 degrees, which corresponds to video data with an aspect ratio greater than 2:1. However, while panoramic video data is more likely to include enough video data to determine an intersection location, the present disclosure is not limited thereto and the video data may have any field of view and/or aspect ratio.

The server(s) 112 may determine (122) positions of faces (e.g., a first face associated with the first person 10-1 and a second face associated with the second person 10-2) represented in the video data. For example, the server(s) 112 may use facial recognition to identify faces, may identify head and shoulders to estimate positions of faces or may identify faces using other techniques known to one of skill in the art. The server(s) 112 may determine the positions of the faces using the video data (e.g., pixel coordinates associated with the faces and/or a direction of the pixel coordinates relative to the image capture device 110) and may determine additional data, such as a distance to the faces or the like. The server(s) 112 may determine (124) gaze vectors (e.g., first gaze vector 106-1 and second gaze vector 106-2), which include at least a direction associated with the face. For example, the gaze vectors may indicate a direction that the face is pointing (e.g., a gaze vector aligned with a front of the face) or a direction that the face is viewing (e.g., a gaze vector determined based on an eye position relative to the face).

The server(s) 112 may determine (126) an area of interest (e.g., area of interest 108). For example, the server(s) 112 may use geometry to determine an intersection location between two or more gaze vectors and to determine a direction associated with the intersection location, the direction relative to a fixed location on the image capture device. Additionally or alternatively, the server(s) 112 may generate a series of circles (in two dimensions, spheres in three dimensions) to determine the intersection location, as discussed in greater detail below. A size of the area of interest may correspond to a size of the intersection location and/or a distance between multiple intersection locations. In some examples, the intersection location may be determined using distance information, such as mapping the gaze vectors to a spatial model (e.g., an environment map) using the distance information to increase a precision of the intersection location.

After determining the area of interest, the server(s) 112 may store the area of interest, the intersection location, the direction, the gaze vectors and/or other gaze data in annotation data associated with individual video frames or in video tags, which are data structures that include information. The server(s) 112 may use the annotation data and/or video tags to generate a video summarization of the video data. For example, the video summarization may summarize lengthy video data (e.g., an hour of recording) in a short video summary (e.g., 2-5 minutes) highlighting the interesting events that occurred in the video data. Therefore, each video clip in the video summary may be relatively short (e.g., between 5-60 seconds) and the portion of the video data included in the video clip may be determined based on the areas of interest determined in step 126. Additionally or alternatively, the server(s) 112 and/or the device 102 may use the area of interest, the intersection location, the direction, the gaze vectors and/or other gaze data to provide additional functionality in a user interface when a user is editing video data. Thus, the device 102 may display a user interface for video editing that includes suggested directions/regions of interest based on the area of interest. For example, if the server(s) 112 determine that an area of interest corresponds to a first direction of 90 degrees approximately one minute into video data, the device 102 may display the video data and display an icon or other indication about one minute into the video data indicating to the user that the first direction of 90 degrees may include an area of interest.

As used herein, "gaze vector" may refer to a direction vector (e.g., ray) emanating from a location of a person and extending (without a magnitude component) in a direction corresponding to where the person is looking. For example, the person may be located at a first location (e.g., ten feet from the image capture device 110 in a first direction, such as an angle of 0 degrees) and looking to his left at a table that is located at a second location (e.g., five feet from the image capture device 110 in a second direction, such as an angle of 90 degrees). While the server(s) 112 may determine a direction associated with the gaze (e.g., a direction from the first location to the second location), the server(s) 112 may be unable to determine a distance associated with the gaze (e.g., how far away the person is looking). Therefore, the gaze vector corresponding to the person would start at the first location and extend as a ray towards the second location without an associated magnitude.

While multiple aspects/embodiments/features may be described on their own (e.g., separate examples illustrated in the following figures), the system 100 may incorporate multiple different features/embodiments as part of the same system without departing from the scope of the disclosure. Thus, the system 100 may include any and all combinations of the features illustrated in the drawings without departing from the present disclosure.

As used herein, panoramic video data may include video data having a field of view beyond 180 degrees, which corresponds to video data with an aspect ratio greater than 2:1. However, the present disclosure is not limited thereto and the video data may be any video data from which an output video having smaller dimensions may be generated. As an example, a frame of panoramic video data may have a resolution of 5200 pixels by 1080 pixels. The panoramic video data may include data output from the one or more image sensors after being processed and/or compressed into a viewable video format. The panoramic video data may include an edited clip or a video clip generated from larger video data, or, in some examples, the panoramic video data may be unedited video data captured by the camera(s) 115. For example, a user of the device 102 may identify relevant video clips, or the user, the image capture device 110 and/or the server(s) 112 may identify portions of unedited video data for additional editing (e.g., such as specifying events of interest or regions of interest within the unedited video data).

As used herein, a video clip may be a short section of the panoramic video data (or other aspect ratio video data) including content determined to be "interesting" or desirable for purposes of video summarization. For example, panoramic video data may include several video clips that the device 102, the image capture device 110 and/or the server(s) 112 may extract from the panoramic video data. The device 102, the image capture device 110 and/or the server(s) 112 may determine a priority metric associated with a video clip using annotation data, the priority metric corresponding to a likelihood of interesting content, and may extract video clips based on the priority metric. Similarly, as used herein a moment may be a region of interest within a video clip. For example, a video clip may include one or several moments associated with a region of interest (e.g., position within the video frame, object/person within the video frame, etc.). A moment may include a bounding box around an interesting object or section of the video clip over time, and additional data may indicate a per-frame priority metric for the moment, a position of a detected face in the video clip, an identity of the detected face, or the like.

As used herein, a video tag is a tag (i.e., data structure) including information that may be used in video summarization, such as a subject (e.g., an object, a person or the like) represented in the video data, an identity of the subject, a direction relative to the camera axis, a size the subject, a position of the subject and/or a timestamp (e.g., a time associated with receiving user input, a time associated with an individual video frame, a range of time associated with a sequence of video frames or the like) associated with video frame(s). As described in greater detail above with regard to FIG. 1, the server(s) 112 may determine an area of interest and include the area of interest in a video tag for video summarization.

The image capture device 110 may capture the panoramic video data using the one or more camera(s) 115. For example, the image capture device 110 may capture a field of view of 360 degrees using a plurality of cameras. In some examples, the plurality of cameras may have a fixed spacing, such as four cameras spaced at 90 degree intervals or six cameras spaced at 60 degree intervals. However, the present disclosure is not limited thereto and the plurality of cameras may be located unevenly depending on the image capture device 110. In addition, the image capture device 110 may capture a field of view less than 360 degrees without departing from the present disclosure. In some examples, the image capture device 110 may capture the panoramic video data using a single camera without mirrors (e.g., a single camera spinning in a circle), a single camera using a plurality of mirrors, a plurality of cameras and a plurality of mirrors and/or a plurality of cameras without mirrors. Thus, the present disclosure is not limited to a specific image capture device 110 as long as the image capture device 110 captures panoramic video data having an aspect ratio exceeding 2:1.

The panoramic video data may include a plurality of video frames (e.g., sequence of image frames, each image frame associated with a particular time) and the portion of the panoramic video data displayed on the display 104 (e.g., cropped image, image data, etc.) may be associated with a position (e.g., x and y pixel coordinates) within the panoramic video data, a direction (e.g., a directional viewpoint included in the panoramic video data) associated with the panoramic video data and/or a direction (e.g., an angle, an azimuth, a two-dimensional vector or the like) of the portion relative to a reference location (e.g., a front of the video/image capturing device). The device 102 may determine a cropped image (e.g., image data) within panoramic image data (e.g., a single video frame of the panoramic video data) associated with an a direction or may determine the direction based on a position of the cropped image within the panoramic image data. Thus, the cropped image may include a portion of the panoramic image data and dimensions of the cropped image may be smaller than dimensions of the panoramic image data, in some examples significantly smaller. The output video data may include a plurality of cropped images. For example, the video data may include multiple directions and the portion of the video data displayed on the device 102 may include a single direction associated with a subject or other object of interest. However, the present disclosure is not limited thereto and the video data displayed on the device 102 may be the entirety of the video data without departing from the present disclosure.

The panoramic video data may have an aspect ratio exceeding 2:1. An aspect ratio is a ratio of one dimension of a video frame to another dimension of a video frame (for example height-width or width-height). For example, a video image having a resolution of 7680 pixels by 1080 pixels corresponds to an aspect ratio of 64:9 or more than 7:1. While the panoramic video data (e.g., panoramic image) may have a certain aspect ratio (for example 7:1 or other larger than 2:1 ratio) due to a panoramic/360 degree nature of the incoming video data (Which may result from a single panoramic camera or multiple images taken from multiple cameras combined to make a single frame of the panoramic video data), the portion of the panoramic video data displayed on the display 104 (e.g., cropped image) may have an aspect ratio that is likely to be used on a viewing device. As a result, an aspect ratio of the portion of the panoramic video data displayed on the display 104 (e.g., cropped image) may be lower than 2:1. For example, the cropped image 12 may have a resolution of 1920 pixels by 1080 pixels (e.g., aspect ratio of 16:9), a resolution of 1140 pixels by 1080 pixels (e.g., aspect ratio of 4:3) or the like. In addition, the resolution and/or aspect ratio of the cropped image 12 may vary based on user preferences.

Pixel coordinates may specify a position within the panoramic image. For example, if the panoramic image has a resolution of 7680 pixels by 1080 pixels, a pixel coordinate of a bottom left pixel in the panoramic image may have pixel coordinates of (0, 0), a pixel coordinate of a top left pixel in the panoramic image may have pixel coordinates of (0, 1080), a pixel coordinate of a top right pixel in the panoramic image may have pixel coordinates of (7680, 1080) and a bottom right pixel in the panoramic image may have pixel coordinates of (7680, 0). Similarly, if the cropped image has a resolution of 1920 pixels by 1080 pixels, a pixel coordinate of a bottom left pixel in the cropped image may have pixel coordinates of (0, 0) in the panoramic image, a pixel coordinate of a top left pixel in the cropped image may have pixel coordinates of (0, 1080) in the panoramic image, a pixel coordinate in a top right pixel in the cropped image may have pixel coordinates of (1920, 1080) in the panoramic image and a bottom right pixel in the cropped image may have pixel coordinates of (1920, 0) in the panoramic image.

Video summarization may summarize lengthy video data (e.g., an hour of recording) in a short video summary (e.g., 2-5 minutes) highlighting the interesting events that occurred in the video data. Therefore, each video clip in the video summary may be relatively short (e.g., between 5-60 seconds) and the portion of the video data included in the video clip may be determined based on the video tags and/or annotation data, thus including in the video summarization the portions of video data (including the objects, directions, and times or the like) indicated by a user and/or determined to be interesting (e.g., priority metric exceeding a threshold) by the server(s) 112. For example, a user may be attending a party and may want to capture the party without being distracted from the party itself. Therefore, the user may locate the image capture device 110 at a central location in a room during the party and may optionally generate tags using the device 102 to identify moments of particular interest to be included in the video summarization. The image capture device 110 may capture video data throughout the party, but the user may generate tags for specific moments or specific guests at the party. The server(s) 112 may generate additional video tags and/or generate a number of video clips using the video tags, where the video clips are associated with a particular time/timestamp, date, and/or position based on the video tags. Additionally or alternatively, the server(s) 112 may determine video clips using annotation data, for example by determining a priority metric for individual video frames in the video data and generating video clips including video frames having a highest priority metric. The video clips may be ordered chronologically in the video summary, where included video clips are ordered by their relative recording time/timestamp, but the present disclosure is not limited thereto and the server(s) 112 may determine an order of the video clips. The video summarization may also include a collection of still images, in a manner akin to a picture slideshow, where the still images are selected from the video data and may include images that were the subject of tags received as described above.

In some examples, the device 102 may generate video tag(s) and transmit the video tag(s) to the server(s) 112 to perform video summarization on the panoramic video data. Each video tag may include information about at least a subject (e.g., an object, a person or the like) represented in the video data, an identity of the subject, a direction relative to the camera axis, a size the subject, a position of the subject and/or a timestamp associated with a corresponding cropped image, although the present disclosure is not limited thereto. In some examples, the video tags may include pixel coordinates associated with the cropped image, while in other examples the video tags may include additional information such as pixel coordinates associated a subject within the cropped image or other information determined by the device 102. Using the video tags, the server(s) 112 may generate edited video clips of the panoramic video data, the edited video clips including portions of the panoramic video data specified by the video tags. For example, the server(s) 112 may generate a video summarization including a series of video clips, some of which include portions of the panoramic video data associated with the video tags.

As part of generating the video summarization, the device 102 may display the output video data and may request input from a user of the device 102. For example, the user may instruct the device 102 to generate additional video data (e.g., create an additional video clip), to increase an amount of video data included in the output video data (e.g., change a beginning time and/or an ending time to increase or decrease a length of the output video data), specify an object of interest, specify an event of interest, specify or modify a direction associated with the output video data, increase or decrease a panning speed or the like. Thus, the server(s) 112 may generate the output video data, the device 102 may display the output video data to the user and receive feedback from the user and the server(s) 112 may generate additional or different output video data based on the user input. The video tags may be configured to be similarly modified by the user during a video editing process.

FIG. 2A illustrates an example of panoramic video data according to embodiments of the present disclosure. As illustrated in FIG. 2A, an image capture device 110 may use camera(s) 115 to capture panoramic video data 210 including a panoramic field of view 250. While FIG. 2A illustrates four cameras 115 spaced at 90 degree intervals, the present disclosure is not limited thereto. Instead, the image capture device 110 may include more/fewer cameras 115 and/or the cameras 115 may be located unevenly or at varying intervals. Additionally or alternatively, the image capture device 110 may capture a field of view less than 360 degrees without departing from the present disclosure.

While FIG. 2A illustrates the panoramic video data 210 being rectangular, the disclosure is not limited thereto and the panoramic video data 210 may be more spherical. For example, the panoramic video data 210 may include additional vertical pixel information and a height of the vertical pixel information may vary. Thus, the panoramic video data 210 may stitch video data from individual cameras to mimic a spherical field of view and include an environment around the image capture device 110 based on specifications of the cameras 115 used in the image capture device 110.

The panoramic video data may include panoramic image 210 having a field of view above 180 degrees and/or an aspect ratio exceeding 2:1. For example, FIG. 2A illustrates the panoramic image 210 corresponding to the panoramic field of view 250 of 360 degrees, with the angle markers shown in dotted lines to correspond to angles relative to the image capture device 110. Such angle markers may or may not be displayed during implementation and are provided here for illustration purposes. The present disclosure is not necessarily limited to panoramic video data and may include any video data, for example video data having a field of view beyond what is normally displayed using a 16:9 aspect ratio on a television. The panoramic image 210 may be generated using one camera or a plurality of cameras without departing from the present disclosure.

While the image capture device 110 may capture video data such as the panoramic image 210, the device 102, the image capture device 110 and/or the server(s) 112 may determine cropped images, such as cropped image 212, for each frame of the video data. By controlling a position of the cropped image 212 within the panoramic image 210, the device 102/image capture device 110/server(s) 112 may effectively crop the video data and generate output video data using a 16:9 aspect ratio (e.g., viewable on high definition televisions without horizontal black bars) that emphasizes desired content within the cropped image 212. However, the present disclosure is not limited to a 16:9 aspect ratio and the aspect ratio may vary.

A position of the cropped image 212 within the panoramic image 210 may be expressed as an angle of view relative to a fixed location of the image capture device 110 (e.g., a direction), such as a front of the image capture device 110. For example, the angle of view may be an azimuth, which is an angular measurement in a spherical coordinate system that describes when a vector from the image capture device 110 to a point of interest is projected perpendicularly onto a reference plane. The angle between the projected vector and a reference vector on the reference plane is called the azimuth. As illustrated in FIG. 2A, the angle of view (e.g., azimuth) for the cropped image 212 is 0 degrees, indicating that the cropped image 212 is at a reference location relative to the image capture device 110, such as in front of the image capture device 110.

FIG. 2B illustrates an example of a user interface including an angle indicator according to embodiments of the present disclosure. As illustrated in FIG. 2B, the device 102 may display the cropped image 212, the panoramic image 210 and an angle indicator 214 on the display 104. The angle indicator may be a visual representation of the angle of view relative to the reference location. The angle indicator 214 may indicate to a user of the device 102 that the cropped image 212 only displays a portion of the overall panoramic image 210 and the position of the cropped image 212 within the panoramic image 210. In addition, a symbol 216 may indicate to the user the portion of the panoramic image 212 included in the cropped image 212. Using the user interface illustrated in FIG. 2B, the user may instruct the device 102 to shift from displaying a first direction (e.g., 0 degrees) in the cropped image 212 to displaying a second direction (e.g., 90 degrees) in the cropped image 212. As a result, the cropped image 212 would be updated to display the second direction, the symbol 216 would be moved within the panoramic image 210 and the angle indicator 214 would change to illustrate the angle associated with the second direction (e.g., 90 degrees).

FIG. 3 is an illustration of an audio component that may be used according to embodiments of the present disclosure. In certain embodiments, direction information may be used to assist in speaker recognition/facial recognition. For example, the image capture device 110 may be configured with a number of components designed to provide direction information related to the capture and processing of speech. FIG. 3 illustrates details of microphone and speaker positioning in an example embodiment of the image capture device 110. In this embodiment, the image capture device 110 includes a microphone array 308 having four microphones 116 that are laterally spaced from each other so that they can be used by audio beamforming components to produce directional audio signals. The microphones 116 may, in some instances, be dispersed around a perimeter of the image capture device 110 in order to apply beampatterns to audio signals based on sound captured by the microphone(s) 116. In the illustrated embodiment, the microphones 116 are positioned at spaced intervals along a perimeter of the image capture device 110, although the present disclosure is not limited thereto. In some examples, the microphone(s) 116 may be spaced between the camera(s) 115 on a substantially vertical surface 304 of the image capture device 110 and/or a top surface 306 of the image capture device 110. In other examples, the microphone(s) 116 may be grouped with the camera(s) 115 (e.g., aligned with or spaced in close proximity to the camera(s) 115) on a substantially vertical surface 304 of the image capture device 110 and/or a top surface 306 of the image capture device 110. Each of the microphones 116 is omnidirectional in the described embodiment, and beamforming technology is used to produce directional audio signals based on signals form the microphones 116. In other embodiments, the microphones may have directional audio reception, which may remove the need for subsequent beamforming.

In various embodiments, the microphone array 308 may include greater or less than the number of microphones shown. For example, an additional microphone may be located in the center of the top surface 306 and used in conjunction with peripheral microphones for producing directionally focused audio signals.

Speaker(s) 302 may be located at the bottom of the image capture device 110, and may be configured to emit sound omnidirectionally, in a 360 degree pattern around the image capture device 110. For example, the speaker(s) 302 may comprise a round speaker element directed downwardly in the lower part of the image capture device 110.

Using the microphone array 308 and the plurality of microphones 116 the image capture device 110 may employ beamforming techniques to isolate desired sounds for purposes of converting those sounds into audio signals for speech processing by the system. Beamforming is the process of applying a set of beamformer coefficients to audio signal data to create beampatterns, or effective directions of gain or attenuation. In some implementations, these volumes may be considered to result from constructive and destructive interference between signals from individual microphones in a microphone array.

The image capture device 110 may include an audio processing module that may include one or more audio beamformers or beamforming components that are configured to generate an audio signal that is focused in a direction from which user speech has been detected. More specifically, the beamforming components may be responsive to spatially separated microphone elements of the microphone array 308 to produce directional audio signals that emphasize sounds originating from different directions relative to the image capture device 110, and to select and output one of the audio signals that is most likely to contain user speech.

Audio beamforming, also referred to as audio array processing, uses a microphone array having multiple microphones that are spaced from each other at known distances. Sound originating from a source is received by each of the microphones. However, because each microphone is potentially at a different distance from the sound source, a propagating sound wave arrives at each of the microphones at slightly different times. This difference in arrival time results in phase differences between audio signals produced by the microphones. The phase differences can be exploited to enhance sounds originating from chosen directions relative to the microphone array.

Beamforming uses signal processing techniques to combine signals from the different microphones so that sound signals originating from a particular direction are emphasized while sound signals from other directions are deemphasized. More specifically, signals from the different microphones are combined in such a way that signals from a particular direction experience constructive interference, while signals from other directions experience destructive interference. The parameters used in beamforming may be varied to dynamically select different directions, even when using a fixed-configuration microphone array.

A given beampattern may be used to selectively gather signals from a particular spatial location where a signal source is present. The selected beampattern may be configured to provide gain or attenuation for the signal source. For example, the beampattern may be focused on a particular user's head allowing for the recovery of the user's speech while attenuating noise from an operating air conditioner that is across the room and in a different direction than the user relative to a device that captures the audio signals.

Such spatial selectivity by using beamforming allows for the rejection or attenuation of undesired signals outside of the beampattern. The increased selectivity of the beampattern improves signal-to-noise ratio for the audio signal. By improving the signal-to-noise ratio, the accuracy of speaker recognition performed on the audio signal is improved.

The processed data from the beamformer module may then undergo additional filtering or be used directly by other modules. For example, a filter may be applied to processed data which is acquiring speech from a user to remove residual audio noise from a machine running in the environment.

FIG. 4 is an illustration of beamforming according to embodiments of the present disclosure. FIG. 4 illustrates a schematic of a beampattern 402 formed by applying beamforming coefficients to signal data acquired from a microphone array of the image capture device 110. As mentioned above, the beampattern 402 results from the application of a set of beamformer coefficients to the signal data. The beampattern generates directions of effective gain or attenuation. In this illustration, the dashed line indicates isometric lines of gain provided by the beamforming coefficients. For example, the gain at the dashed line here may be +12 decibels (dB) relative to an isotropic microphone.

The beampattern 402 may exhibit a plurality of lobes, or regions of gain, with gain predominating in a particular direction designated the beampattern direction 404. A main lobe 406 is shown here extending along the beampattern direction 404. A main lobe beam-width 408 is shown, indicating a maximum width of the main lobe 406. In this example, the beampattern 402 also includes side lobes 410, 412, 414, and 416. Opposite the main lobe 406 along the beampattern direction 404 is the back lobe 418. Disposed around the beampattern 402 are null regions 420. These null regions are areas of attenuation to signals. In the example, the person 10 resides within the main lobe 406 and benefits from the gain provided by the beampattern 402 and exhibits an improved SNR ratio compared to a signal acquired with non-beamforming. In contrast, if the person 10 were to speak from a null region, the resulting audio signal may be significantly reduced. As shown in this illustration, the use of the beampattern provides for gain in signal acquisition compared to non-beamforming. Beamforming also allows for spatial selectivity, effectively allowing the system to "turn a deaf ear" on a signal which is not of interest. Beamforming may result in directional audio signal(s) that may then be processed by other components of the image capture device 110 and/or system 100.

While beamforming alone may increase a signal-to-noise (SNR) ratio of an audio signal, combining known acoustic characteristics of an environment (e.g., a room impulse response (RIR)) and heuristic knowledge of previous beampattern lobe selection may provide an even better indication of a speaking user's likely location within the environment. In some instances, a device includes multiple microphones that capture audio signals that include user speech. As is known and as used herein, "capturing" an audio signal includes a microphone transducing audio waves of captured sound to an electrical signal and a codec digitizing the signal. The device may also include functionality for applying different beampatterns to the captured audio signals, with each beampattern having multiple lobes. By identifying lobes most likely to contain user speech using the combination discussed above, the techniques enable devotion of additional processing resources of the portion of an audio signal most likely to contain user speech to provide better echo canceling and thus a cleaner SNR ratio in the resulting processed audio signal.

To determine a value of an acoustic characteristic of an environment (e.g., an RIR of the environment), the image capture device 110 may emit sounds at known frequencies (e.g., chirps, text-to-speech audio, music or spoken word content playback, etc.) to measure a reverberant signature of the environment to generate an RIR of the environment. Measured over time in an ongoing fashion, the device may be able to generate a consistent picture of the RIR and the reverberant qualities of the environment, thus better enabling the device to determine or approximate where it is located in relation to walls or corners of the environment (assuming the device is stationary). Further, if the device is moved, the device may be able to determine this change by noticing a change in the RIR pattern. In conjunction with this information, by tracking which lobe of a beampattern the device most often selects as having the strongest spoken signal path over time, the device may begin to notice patterns in which lobes are selected. If a certain set of lobes (or microphones) is selected, the device can heuristically determine the user's typical speaking location in the environment. The device may devote more CPU resources to digital signal processing (DSP) techniques for that lobe or set of lobes. For example, the device may run acoustic echo cancelation (AEC) at full strength across the three most commonly targeted lobes, instead of picking a single lobe to run AEC at full strength. The techniques may thus improve subsequent automatic speech recognition (ASR) and/or speaker recognition results as long as the device is not rotated or moved. And, if the device is moved, the techniques may help the device to determine this change by comparing current RIR results to historical ones to recognize differences that are significant enough to cause the device to begin processing the signal coming from all lobes approximately equally, rather than focusing only on the most commonly targeted lobes.

By focusing processing resources on a portion of an audio signal most likely to include user speech, the SNR of that portion may be increased as compared to the SNR if processing resources were spread out equally to the entire audio signal. This higher SNR for the most pertinent portion of the audio signal may increase the efficacy of the image capture device 110 when performing speaker recognition on the resulting audio signal.

Using the beamforming and directional based techniques above, the system may determine a direction of detected audio relative to the audio capture components. Such direction information may be used to link speech/a recognized speaker identity to video data as described below.

FIGS. 5A-5C illustrate examples of determining directions of faces and speech according to embodiments of the present disclosure. As illustrated in FIG. 5A, the image capture device 110 may capture video data 10 in 360 degrees around the image capture device 110 using camera(s) 115, such that the field of view (FOV) 500 includes Quadrant 1, Quadrant 2, Quadrant 3 and Quadrant 4. However, the present disclosure is not limited thereto and the image capture device 110 may capture video data 10 in a wide FOV around the image capture device 110 (e.g., from 180 degrees to 360 degrees) without departing from the present disclosure. In addition, the image capture device 110 may capture audio data 12 in 360 degrees around the image capture device 110 using the microphone(s) 116. Therefore, the image capture device 110 may capture video data 10 and audio data 12 including a first person 10-1, a second person 10-2, a third person 10-3, a fourth person 10-4 and a fifth person 10-5.

As illustrated in FIG. 5B, the image capture device 110 may detect a first face 522-1 (associated with the first person 10-1), a second face 522-2 (associated with the second person 10-2), a third face 522-3 (associated with the third person 10-3), a fourth face 522-4 (associated with the fourth person 10-4) and a fifth face 522-5 (associated with the fifth person 10-5). Using techniques known to one of skill in the art, the image capture device 110 may determine a first face direction 524-1 to the first face 522-1, a second face direction 524-2 to the second face 522-2, a third face direction 524-3 to the third face 522-3, a fourth face direction 524-4 to the fourth face 522-4 and a fifth face direction 524-5 to the fifth face 522-5, the directions 524 relative to the image capture device 110.

As illustrated in FIG. 5C, the image capture device 110 may detect first speech 532-1 (associated with the first person 10-1) and second speech 532-2 (associated with the fifth person 10-5). In this example, the second person 10-2, third person 10-3 and fourth person 10-4 may be silent during a period of time and therefore may not be included in the audio data 12. Using techniques known to one of skill in the art or disclosed in greater detail above with regard to FIGS. 3 and 4, the image capture device 110 may determine a first speech direction 534-1 to the first speech 532-1 and a second speech direction 534-2 to the second speech 532-2, the directions 534 relative to the image capture device 110.

In some examples, the image capture device 110 may identify the first person 10-1 and associate the first person 10-1 with the first face 522-1 and the first speech 532-1 based on the first face direction 524-1 and the first speech direction 534-1, despite the first person 10-1 not being included in the speaker recognition database. For example, the image capture device 110 may identify the first person 10-1 from the first face 522-1 using facial recognition, may identify that the first face 522-1 is talking during the first speech 532-1, may determine that the first face direction 524-1 matches the first speech direction 534-1 and may therefore associate the first person 10-1 with the first face 522-1 and the first speech 532-1.

In other examples, the image capture device 110 may identify the fifth person 10-5 and associate the fifth person 10-5 with the fifth face 522-5 and the second speech 532-2 based on the fifth face direction 524-5 and the second speech direction 534-2, despite the fifth person 10-5 not being included in the facial recognition database. For example, the image capture device 110 may identify the fifth person 10-5 from the second speech 532-2 using speaker recognition, may identify that the fifth face 522-5 is talking during the second speech 532-2, may determine that the fifth face direction 524-5 matches the second speech direction 534-2 and may therefore associate the fifth person 10-5 with the fifth face 522-5 and the second speech 532-2.

While FIGS. 5B-5C are described in reference to the image capture device 110, the present disclosure is not limited thereto. Therefore, any of the steps described as being performed by the image capture device 110 may instead be performed by the device 102, the server(s) 112 or the like. Similarly, any of the steps described below with regard to FIG. 6 and/or FIG. 7 may be performed by the device 102, the image capture device 110 and/or the server(s) 112 without departing from the present disclosure. For ease of explanation, the following steps will be described as being performed by the server(s) 112.

FIG. 6 illustrates an example of determining identities and locations from image data according to embodiments of the present disclosure. As illustrated in FIG. 6, the server(s) 112 may receive image data 610 associated with Timestamp A of the video data 10. Thus, the server(s) 112 may determine identities/locations associated with a particular instant in time corresponding to Timestamp A. As shown the image data 610 may include image data from multiple cameras associated with the image capture device 110, for example one camera for Quadrant 1, one camera for Quadrant 2, one camera for Quadrant 3 and one camera for Quadrant 4. Using facial recognition, the server(s) 112 may detect, in the image data 610, the first face 522-1, the second face 522-2, the third face 522-3, the fourth face 522-4 and the fifth face 522-5, and may associate the first face 522-1 with the first identity 626-1, the second face 522-2 with the second identity 626-2, the third face 522-3 with the third identity 626-3 and the fourth face 522-4 with the fourth identity 626-4. However, the fifth face 522-5 may not be in the facial recognition database and therefore the server(s) 112 may assign unknown identity 628 to the fifth face 522-5.

Figure 7:
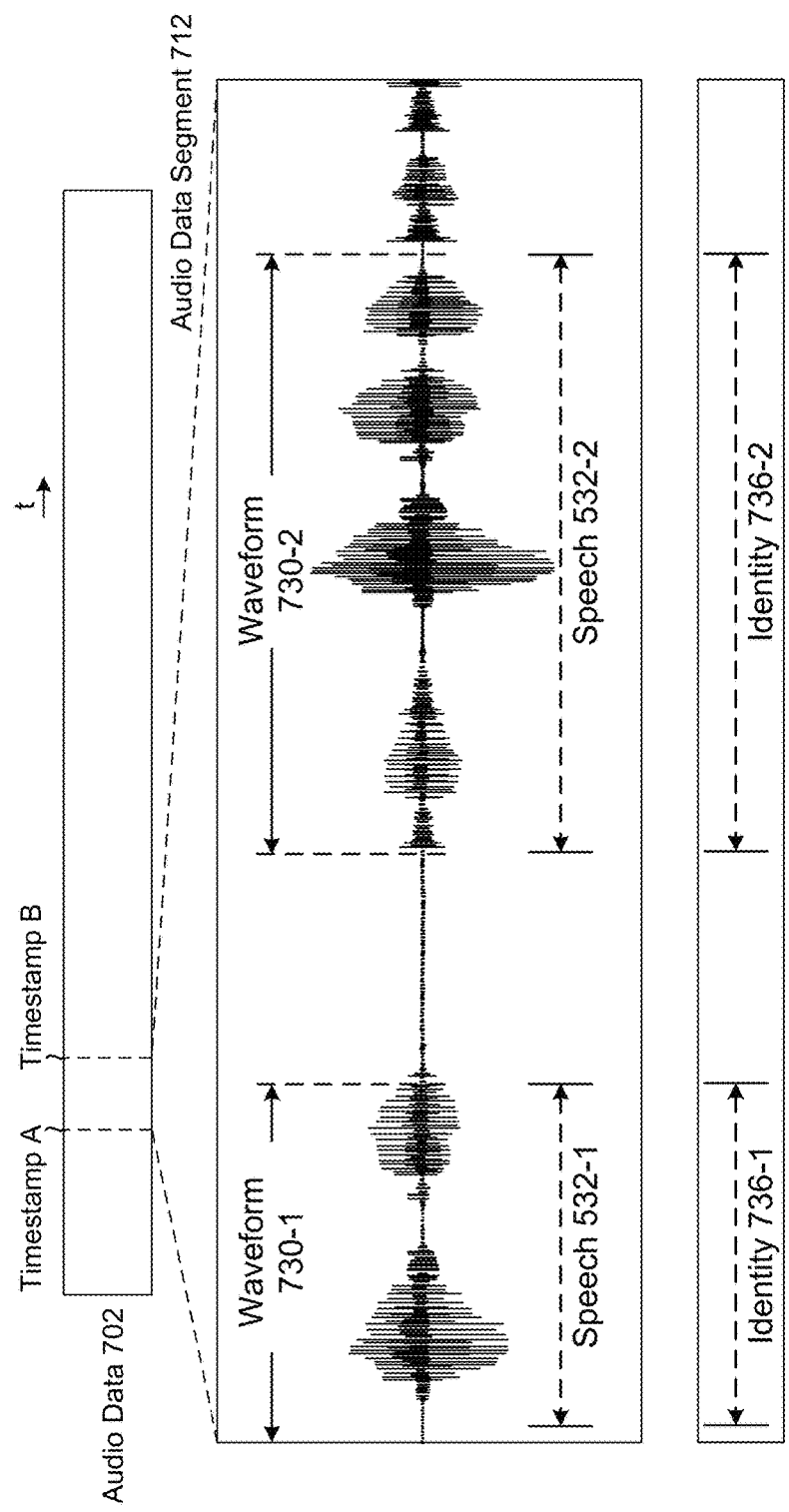
FIG. 7 illustrates an example of determining locations and identities using audio data according to embodiments of the present disclosure.

FIG. 7 illustrates an example of determining identities and locations from audio data according to embodiments of the present disclosure. As illustrated in FIG. 7, the server(s) 112 may receive an audio data clip 712 between Timestamp A and Timestamp B of the audio data 702. Using speaker recognition, the server(s) 112 may detect a first waveform 730-1 and a second waveform 730-2, may associate the first waveform 730-1 with the first speech 532-1 and the second waveform 730-2 with the second speech 532-2, and may associate the first speech 532-1 with a first identity 736-1 and the second speech 532-2 with a second identity 736-2. By associating the first speech 532-1 with the first identity 736-1 and/or the second speech 532-2 with the second identity 736-2, the server(s) 112 may identify faces represented in the video data and/or distances/locations associated with the faces represented in the video data. For example, the server(s) 112 may determine that a face is talking at a first location in the video data, may associate the face with speech represented in audio data, may determine an identity, location and/or distance associated with the speech and may use the identity, location and/or distance information to determine a gaze vector associated with the face and/or area of interest associated with the gaze vector. Thus, the server(s) 112 may supplement information determined from the video data with information determined from the audio data. Additionally or alternatively, the server(s) 112 may track individual identities using facial recognition and/or speech recognition throughout the video data and audio data.

While FIG. 7 illustrates the audio data 702 including speech 532 and the server(s) 112 identifying an identity 736 corresponding to the speech 532, the present disclosure is not limited thereto. Instead, the image capture device 110/server(s) 112 may perform beamforming (as discussed in greater detail above with regard to FIG. 4) to identify non-speech included in the audio and/or location information associated with the non-speech. For example, a loud noise (e.g., a dropped glass in a kitchen) may be captured in the audio data 702 and the image capture device 110/server(s) 112 may identify a location associated with the loud noise.

Various machine learning techniques may be used to recognize a face using facial recognition and/or a speaker using speaker recognition. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Many different training examples may be used during training. For example, as discussed above, additional image data and/or additional audio data may be acquired may be used as "ground truth" for the training examples. In some examples, the server(s) 112 may determine a confidence score associated with the additional image data and/or additional audio data (e.g., a confidence level that the identity is correctly predicted by the server(s) 112 based on the additional image data and/or additional audio data) and may use additional image data and/or additional audio data associated with a high confidence score (e.g., confidence score above 80%).

Using the techniques described above, the server(s) 112 may determine locations associated with the identities 626 and/or 736 and/or faces 522. Thus, the server(s) 112 may associate audio data with image data and use a combination of image data, audio data and/or depth sensors to determine the locations (e.g., direction and distance) associated with faces represented in the image data. For example, the server(s) 112 may determine a position of a face within the image data and determine a direction corresponding to the position, the direction relative to a fixed orientation (e.g., a front of the image capture device 110). An example of a position may be pixel coordinates within the image data and an example of a direction may be an angle (e.g., a number between 0-360 degrees) or a two-dimensional vector based on the pixel coordinates. The server(s) 112 may determine a distance of the face based on the image data (e.g., estimating a distance based on a head size in the image data), based on stereoscopic image data (e.g., identifying the face in overlapping image data from two cameras 115 and estimating a distance), based on the audio data (e.g., beamforming using speech associated with the face), using a depth sensor or the like. In some examples, the server(s) 112 may confirm distance estimates and/or establish a baseline estimate using two or more of the techniques described above. For example, the server(s) 112 may determine a distance to a face using a first technique (e.g., audio data) and use the distance to improve an accuracy of a second technique (e.g., relative size of the face/head represented in the video data).

The server(s) 112 may use distance/location data to determine a beginning of a gaze vector. For example, using the video data the server(s) 112 may identify a face in the video data, determine a direction associated with the face (e.g., a direction of the face in an environment relative to the image capture device 110) and may determine a gaze vector associated with the face. Using the video data or additional sensor data as described above, the server(s) 112 may determine a distance to the face and may determine a location in the environment using the direction and the distance. By associating the gaze vector with the location, the server(s) 112 may determine an area of interest with greater accuracy and/or precision.

In some examples, the server(s) 112 may use distance/location data to increase a confidence score associated with an area of interest and/or confirm the area of interest. For example, the server(s) 112 may identify an area of interest in a portion of the video data based on gazes intersecting at a first time. At the first time, the server(s) 112 may additionally identify a sound of interest (e.g., a sudden loud noise captured in the audio data) and determine a distance/location to the sound of interest. When the sound of interest corresponds to the area of interest, the server(s) 112 may increase the confidence score associated with the area of interest (e.g., increase a likelihood that the gazes are intersecting at the area of interest), confirm the area of interest (e.g., select a first area of interest over a second area of interest), associate the distance/location information with the area of interest (e.g., refine the distance/location information associated with the area of interest using the distance/location information associated with the sound of interest) or the like. Thus, additional data generated by microphones (e.g., audio data), gyroscopic sensors (e.g., motion data) or other sensors may be associated with the video/image data to improve an accuracy and/or confidence associated with the area of interest.

For ease of explanation, examples are provided that reference identifying faces, heads, people or the like. These examples are intended to be non-limiting to conceptually illustrate how to determine an area of interest. Thus, the server(s) 112 may use similar techniques to identify a face, a head, a head and shoulders, a person, eyes or any other attributes associated with determining a direction of a gaze. For example, while an example may illustrate identifying a face, the server(s) 112 may identify a head and shoulders instead of identifying the face without departing from the present disclosure. Additionally or alternatively, the server(s) 112 may identify a combination of faces, heads, heads and shoulders, etc. or may identify a first attribute (e.g., head and shoulders) at a first time and subsequently identify a second attribute (e.g., a face) at a second time without departing from the disclosure.

FIG. 8A-8D illustrates examples of gaze tracking according to embodiments of the present disclosure. The server(s) 112 may use a variety of techniques to determine a gaze vector, only a few of which are illustrated herein. In a first example, the server(s) 112 may determine a position of a face and eyes and may determine a gaze vector based on the position of the eyes relative to the position of the face. In a second example, the server(s) 112 may determine a direction that a face is pointing and may determine a gaze vector based on the direction that the face is pointing. In a third example, the server(s) 112 may determine a first area associated with a left portion of a face and a second area associated with a right portion of the face and may determine a gaze vector based on a ratio between the first area and the second area. In a fourth example, the server(s) 112 may not identify a face and may instead identify a head and determine a gaze vector based on a direction that the head is pointing. However, the present disclosure is not limited thereto and the server(s) 112 may perform gaze tracking using techniques known to one of skill in the art without departing from the disclosure.

As illustrated in FIG. 8A, a person's face may be positioned identically in a first example 800-1 and a second example 800-2, but the person may be looking in a first direction in the first example 800-1 and looking in a second direction in the second example 800-2. To accurately determine what the person is viewing, the server(s) 112 may identify an eye position relative to the face and may determine a gaze vector based on the eye position. For example, in the first example 800-1 the server(s) 112 may determine a first position of the eyes relative to the face and may therefore determine a first gaze vector 810-1. In contrast, in the second example 800-2 the server(s) 112 may determine a second position of the eyes relative to the face and may therefore determine a second gaze vector 810-2. Therefore, by determining a position of eyes relative to a face, the server(s) 112 may determine gaze vectors that correspond to where the person is viewing. The server(s) 112 may identify the eye position using a variety of techniques, such as identifying a pupil in the eye and/or based on non-uniform roundness of eyes using reflections of point-source lights or the like. For example, an eye may be non-spherical and if multiple lights are reflected by the eye, the server(s) 112 may determine a gaze vector associated with the eye based on a location of the lights.

As illustrated in FIG. 8B, a person's face may be positioned differently between a first example 802-1 and a second example 802-2, such that the person may be looking in a first direction in the first example 802-1 and looking in a second direction in the second example 802-2. The server(s) 112 may identify a direction that the face is pointed and may determine a gaze vector based on the direction. For example, in the first example 802-1 the server(s) 112 may determine a first direction of the face and may therefore determine a first gaze vector 812-1. In contrast, in the second example 802-2 the server(s) 112 may determine a second direction of the face and may therefore determine a second gaze vector 812-2. Therefore, by determining a direction that a face is pointing, the server(s) 112 may determine gaze vectors that correspond to where the person is viewing.

Figure 8C:
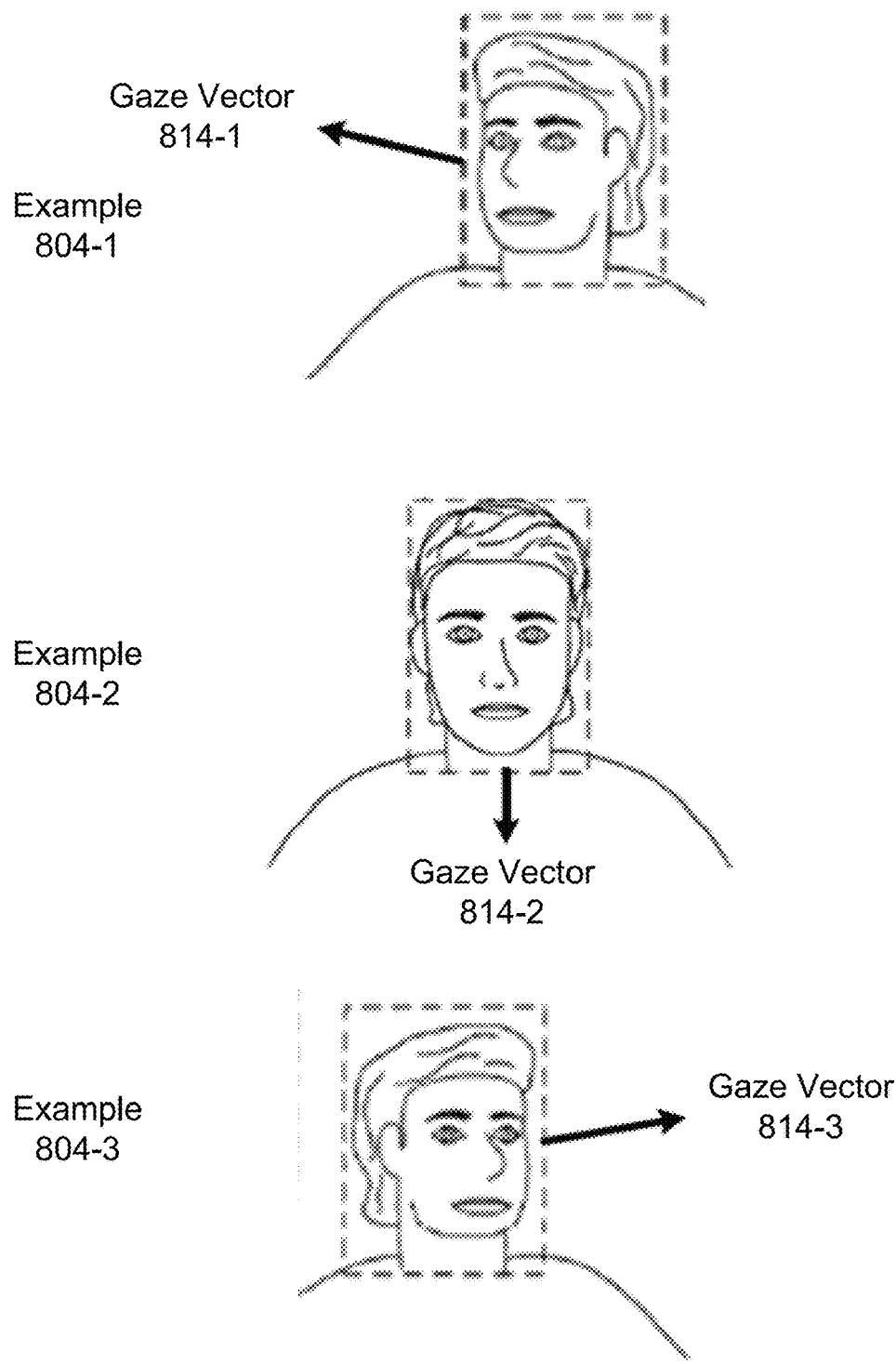

As illustrated in FIG. 8C, a person's face may be positioned differently between a first example 804-1, a second example 804-2 and a third example 804-3, such that the person may be looking in a first direction in the first example 804-1, looking in a second direction in the second example 804-2 and looking in a third direction in the third example 804-3. The server(s) 112 may identify a direction that the face is pointed based on portions of the face visible in the video frame and may determine a gaze vector based on the direction. For example, the server(s) 112 may determine a first area associated with a left portion of the face and a second area associated with the right portion of the face and determine a ratio between the first area and the second area. In the first example 804-1, the first area (e.g., left portion) is smaller than the second area (e.g., right portion) and therefore the server(s) 112 may determine a first gaze vector 814-1 indicating that the face is looking to the left (relative to the video frame). In the second example 804-2, the first area (e.g., left portion) is approximately equal to the second area (e.g., right portion) and therefore the server(s) 112 may determine a second gaze vector 814-2 indicating that the face is looking straight (e.g., out of the video frame). In the third example 804-3, the first area (e.g., left portion) is larger than the second area (e.g., right portion) and therefore the server(s) 112 may determine a third gaze vector 814-3 indicating that the face is looking to the right (relative to the video frame).

Figure 8D:
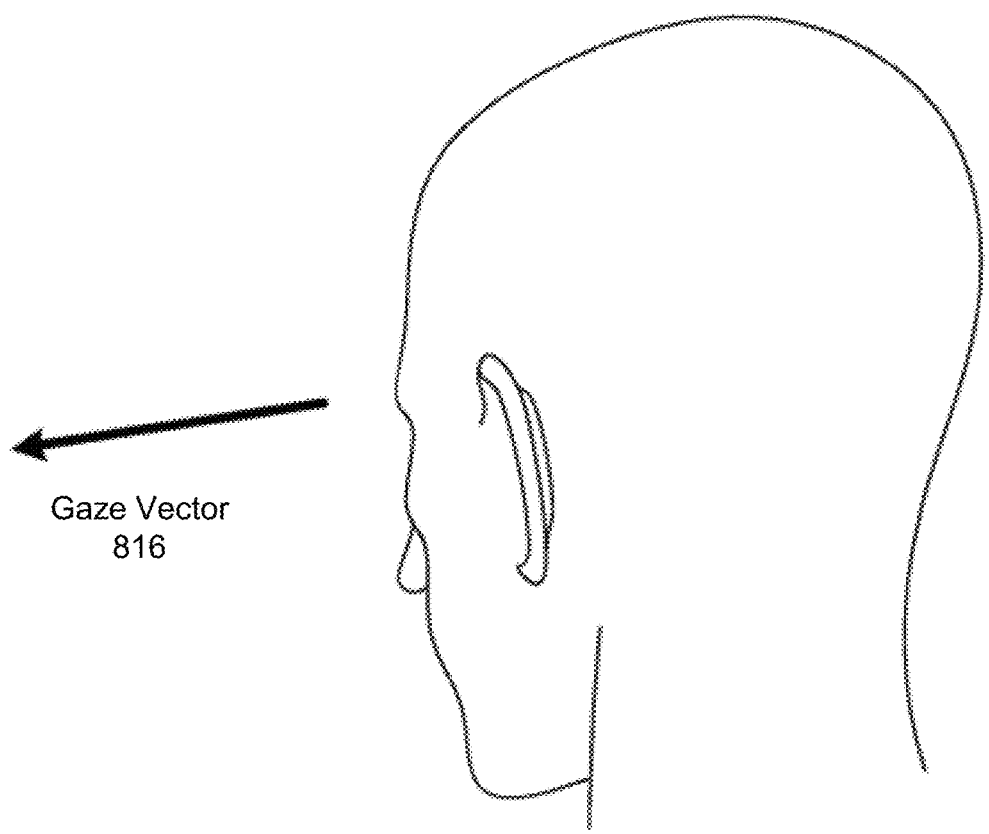

As illustrated in FIG. 8D, a person's face may be positioned away from the image capture device 110 (e.g., only a portion of the face may be represented in the video data). The server(s) 112 may not identify the face but may instead identify the head, for example by detecting head and shoulders, back of the head or the like. The server(s) 112 may determine a direction that the face is pointed based on portions of the head visible in the video frame and may determine a gaze vector based on the direction. As illustrated in example 806, the server(s) 112 may identify a back of a head and may determine a direction that the head is looking, for example based on a position of the head relative to a body of the person, based on a position of ears or the like. Therefore, the server(s) 112 may determine a gaze vector 816 associated with the head even though only a portion of the face is represented in the video data (or in some examples, none of the face is represented in the video data).

While FIGS. 8A-8D illustrate several examples of gaze tracking, the present disclosure is not limited thereto and the server(s) 112 may determine gaze vectors using techniques known to one of skill in the art. In addition, while FIGS. 8A-8D illustrate multiple examples individually, the server(s) 112 may determine gaze vectors using any of the examples illustrated or a combination thereof without departing from the present disclosure.

Figure 9B:
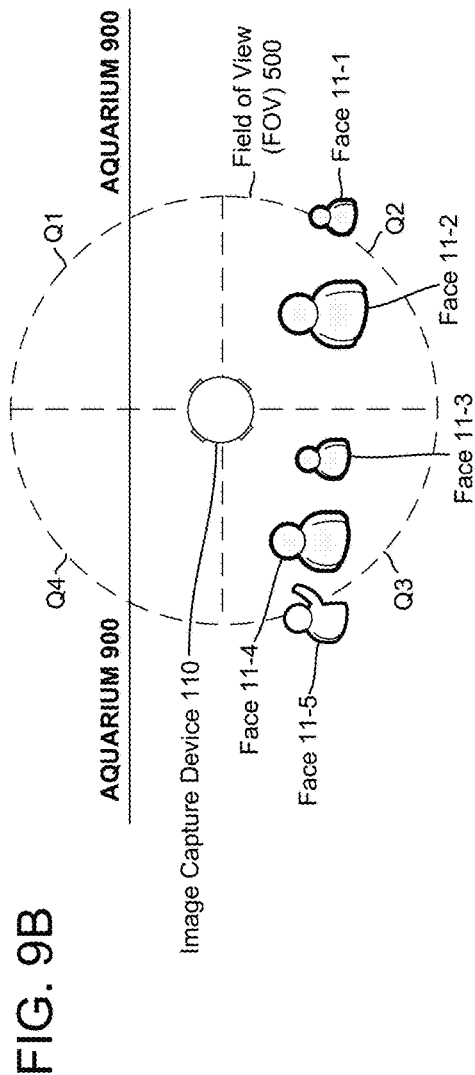
Figure 9C:
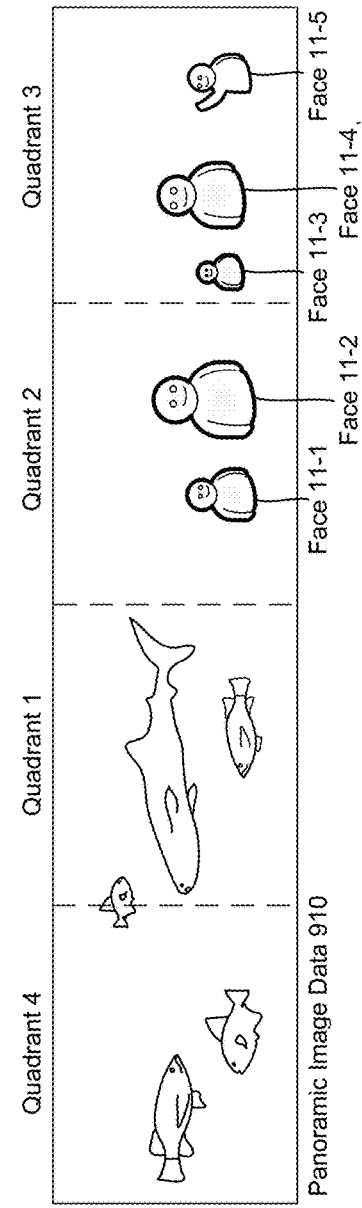

FIGS. 9A-9C illustrate an example of capturing panoramic image data according to embodiments of the present disclosure. As illustrated in FIG. 9A, an image capture device 110 may be located in an aquarium setting, including five people (identified in the video data as five faces) and an aquarium 900 full of fish. Based on a location of the image capture device 110, the aquarium 900 may comprise approximately half of the video data and the viewing area including the five people may comprise the remaining portion. For example, FIG. 9B illustrates the aquarium 900 extending from Quadrant 4 (Q4) to Quadrant 1 (Q1) in a Field of View (FOV) 500, while Quadrant 2 (Q2) includes a first face 11-1 and a second face 11-2 and Quadrant 3 (Q3) includes a third face 11-3, a fourth face 11-4 and a fifth face 11-5. Thus, the panoramic video data captured by the image capture device 110 is illustrated by panoramic image data 910, which includes the aquarium 900 in Quadrants 4 and 1 and the faces 11 in Quadrants 2 and 3.

When the server(s) 112 process the video data captured by the image capture device 110, the server(s) 112 may attempt to emphasize interesting areas within the video data. In this example, the aquarium 900 may be less distinct and lacks faces 11, so the server(s) 112 may determine to emphasize the faces 11 instead of the aquarium 900. Therefore, the server(s) 112 may determine that the interesting areas include Quadrant 2 and Quadrant 3, omitting the aquarium 900 in Quadrant 4 and Quadrant 1. However, a user editing the video data may determine to emphasize the aquarium 900 and may instead determine that the interesting areas include Quadrant 4 and Quadrant 1.

To improve a video summarization generated by the server(s) 112, the server(s) 112 may perform gaze tracking to assist in determining the interesting areas. For example, the server(s) 112 may identify faces 11 in Quadrant 2 and Quadrant 3 and may determine that the faces 11 are focused on a specific position in Quadrant 4 and/or Quadrant 1. Therefore, instead of or in addition to including the faces 11 in the interesting area, the server(s) 112 may include the specific position in the interesting area based on the faces 11 focusing on the specific position, as will be described in greater detail below.

In this example, the server(s) 112 may obtain a variety of data points and/or gaze vectors over the duration of the video data. The server(s) 112 may determine gaze vectors and corresponding interesting areas for individual video frames (e.g., image data) and may store the gaze vectors, interesting areas and/or additional data associated with the interesting areas in video tags and/or annotation data associated with the video data. For example, the server(s) 112 may determine first gaze vectors and corresponding first interesting area at a first time and separately determine second gaze vectors and corresponding second interesting area at a second time.

Additionally or alternatively, the server(s) 112 may track the gaze vectors and/or interesting areas over a period of time. For example, the server(s) 112 may track first gaze vectors associated with a first face 11-1 for individual video frames and may generate a first heat map indicating the first gaze vectors and/or first positions in the video data viewed by the first face 11-1 during the period of time. Similarly, the server(s) 112 may track second gaze vectors associated with a second face 11-2 for individual video frames and may generate a second heat map indicating the second gaze vectors and/or second positions in the video data viewed by the second face 11-2 during the period of time. In some examples, the server(s) 112 may determine intersection locations between the first gaze vectors and the second gaze vectors during individual video frames. For example, something notable may occur (e.g., fish swims back and forth chasing a child) and multiple faces 11 may be aligned momentarily. This is an example of an instantaneous gaze and the server(s) 112 may determine that multiple gaze vectors are associated with a single point in the video data at the same time, indicating an interesting event occurred. In other examples, the server(s) 112 may determine intersection locations between the first heat map and the second heat map over the period of time. For example, the first face 11-1 may be particularly interested in a first position (e.g., a large whale shark) and the first heat map may indicate that the first face 11-1 persistently viewed the first position, while momentarily straying to view other positions (e.g., other fish, other faces, etc.). Similarly, the second face 11-2 may be particularly interested in the first position and the second heat map may indicate that the second face 11-2 persistently viewed the first position, while momentarily straying to view other positions. This is an example of a persistent gaze, and while the first face 11-1 and the second face 11-2 may not be aligned at any single point in time, the server(s) 112 may determine that the first position is a spot of interest based on the first heat map and the second heat map.

Thus, the server(s) 112 may determine instantaneous gazes, persistent gazes and/or other gaze data based on gaze tracking. The server(s) 112 may track individual gazes over time, individual regions or points of interest over time for individual faces, individual regions or points of interest over time determined using intersection locations (e.g., locations where two or more gaze vectors intersect) and/or may include previous gaze vectors when determining intersection locations (e.g., tail to the gaze including previous gaze vectors from previous video frames). In addition, the server(s) 112 may cross reference the gaze data with objects represented in the video data, such as a person moving about a stage or a fish swimming around the aquarium.

FIG. 10 illustrates an example of determining gaze vectors according to embodiments of the present disclosure. As illustrated in FIG. 10, the panoramic image data 910 includes a first face 11-1, a second face 11-2, a third face 11-3, a fourth face 11-4 and a fifth face 11-5. Based on gaze tracking, the server(s) 112 may determine a first gaze vector 1010-1, a second gaze vector 1010-2, a third gaze vector 1010-3, a fourth gaze vector 1010-4 and a fifth gaze vector 1010-5, as illustrated by panoramic image data 1010.

Each of the gaze vectors 1010 may indicate a direction relative to a starting location. For example, the server(s) 112 may determine a first location (e.g., a first distance from the image capture device 110 and/or a first position/direction within the panoramic image data 910) associated with the first face 11-1, as discussed in greater detail above. The server(s) 112 may also determine a first gaze vector 1010-1 indicating a direction that the first face 11-1 is looking, the first gaze vector 1010-1 situated at the first location. In some examples, the server(s) 112 may determine the first gaze vector 1010-1 based on a position of eyes of the first face 11-1. For example, the server(s) 112 may determine the position of the eyes and may determine the first gaze vector 1010-1 based on the position of the eyes relative to the position of the first face 11-1. In other examples, the server(s) 112 may determine the first gaze vector 1010-1 based on a position of the head of the first face 11-1. For example, the server(s) 112 may identify the head and determine the first gaze vector 1010-1 based on the position of the first face 11-1 relative to the head (e.g., a direction the first face 11-1 is pointing). While determining the first gaze vector 1010-1 based on the position of the eyes is more precise (e.g., the first gaze vector 1010-1 corresponds with a position at which the first face 11-1 is looking), the server(s) 112 may not be able to determine the position of the eyes due to image quality, resolution, distance to the first face 11-1, the first face 11-1 facing away from the camera (so only the back of the head is visible) or other limitations associated with the video data. Thus, while determining the first gaze vector 1010-1 based on the position of the head is less precise (e.g., the first face 11-1 may be pointed in a first direction but viewing a second direction), the server(s) 112 may determine a direction of the first face 11-1 more easily despite variation in image quality, resolution, distance to the first face 11-1 or other limitations associated with the video data. In addition, the server(s) 112 may perform other techniques for gaze tracking without departing from the present disclosure.

Figure 11B:
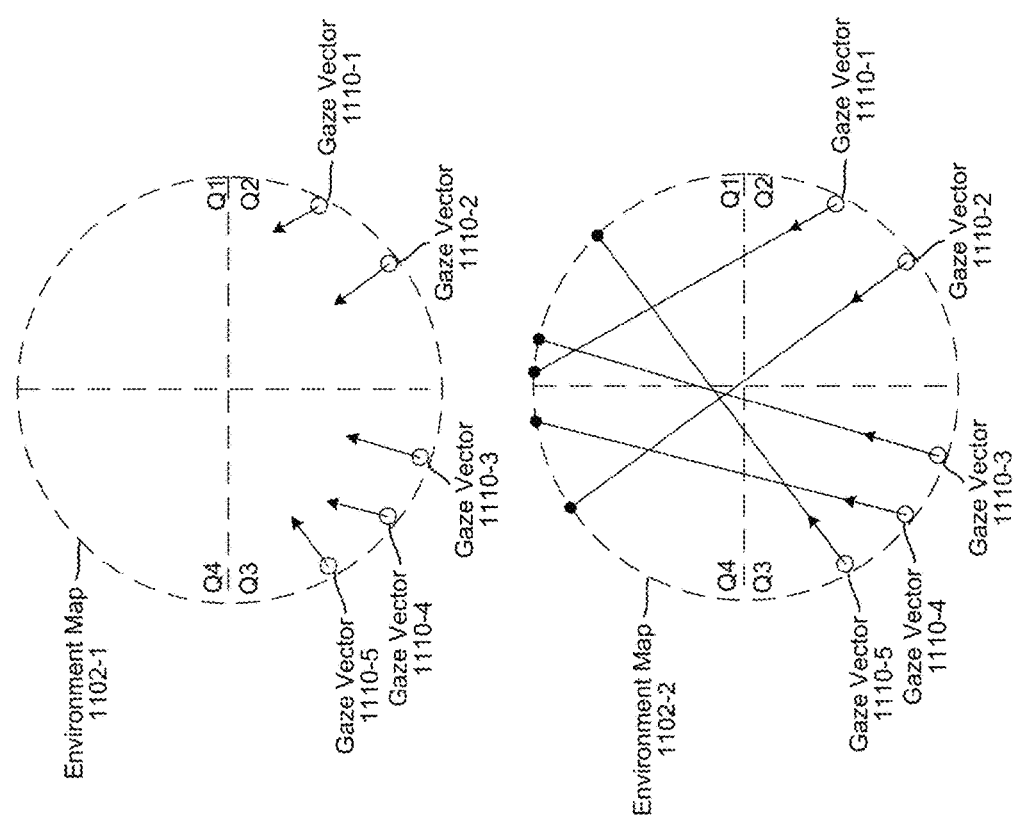
Figure 11C:
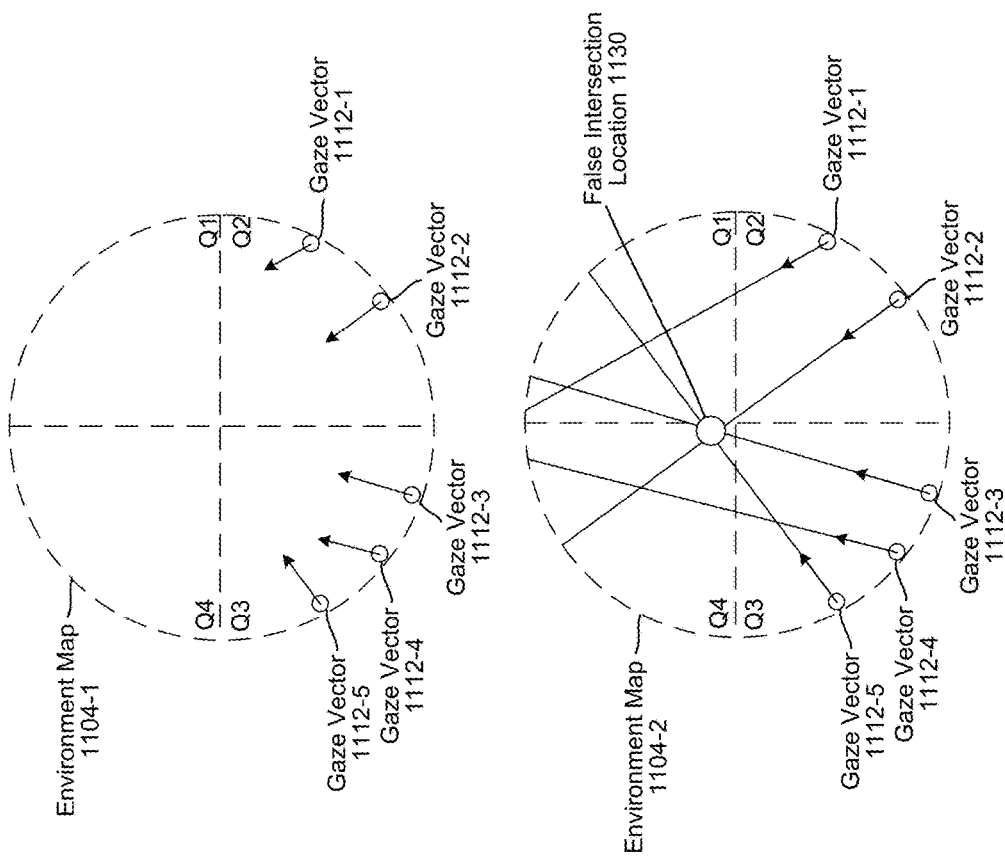

FIGS. 11A-11C illustrate examples of determining intersection locations using gaze vectors (for example in a spatial model such as an environment map) according to embodiments of the present disclosure. The spatial model may be generated using techniques known to one of skill in the art. As illustrated in FIG. 11A, the server(s) 112 may generate a first environment map 1100-1 using the panoramic image data 1010. For example, the panoramic image data 1010 may extend in a circle (with the image capture device implicitly in a center of the circle), with each object represented in the panoramic image data 1010 located along a perimeter of the circle. Thus, the aquarium 900 extends along the perimeter of the circle within Quadrant 4 and Quadrant 1 and the gaze vectors 1010 are located along the perimeter of the circle within Quadrant 2 and Quadrant 3. Using this technique, the first environment map 1100-1 may simplify an environment around the image capture device 110 by approximating the environment in two dimensions (simplifying geometry associated with determining intersection locations between gaze vectors 1010) and associating each object represented in the panoramic image data 1010 with a uniform distance from the image capture device 110.

Using the first environment map 1100-1, the server(s) 112 may determine an intersection location 1120 corresponding to an intersection of each of the first gaze vector 1010-1, the second gaze vector 1010-2, the third gaze vector 1010-3, the fourth gaze vector 1010-4 and the fifth gaze vector 1010-5, as illustrated in the second environment map 1100-2. For example, the server(s) 112 may identify the intersection location 1120, determine a direction from the image capture device 110 to the intersection location 1120 and identify an area of interest 1122 corresponding t to the intersection location 1120 using the direction. As illustrated in FIG. 11A, the intersection location 1120 corresponds to the area of interest 1122, which is a portion of the panoramic image data 1010 (e.g., a region of the video data representing a fish and a whale shark). While the gaze vectors 1010 are aligned in this example, the present disclosure is not limited thereto and the intersection location 1120 may correspond to an intersection between any two of the gaze vectors 1010 without departing from the present disclosure. For example, the first gaze vector 1010-1 and the second gaze vector 1010-2 may intersect at the intersection location 1120 while the third gaze vector 1010-3, the fourth gaze vector 1010-4 and the fifth gaze vector 1010-5 diverge in different directions.

In some examples, gazes are not aligned and therefore gaze vectors do not intersect. For example, FIG. 11B illustrates a first environment map 1102-1 including gaze vectors 1110 that are not aligned. For example, the gaze vectors 1110 correspond to different locations along a perimeter of the first environment map 1102-1, as illustrated in a second environment map 1102-2. The server(s) 112 may analyze the video data, generate the second environment map 1102-2 and determine that there isn't an intersection location associated with the gaze vectors 1110.

In some examples, gazes are not aligned but the server(s) 112 may determine a false intersection location. For example, a first person may be viewing a first object (e.g., a first gaze vector is associated with a first position) while a second person is viewing a second object (e.g., a second gaze vector is associated with a second position). Due to the simplicity of the environment map approximating the environment in two dimensions, the first gaze vector may intersect the second gaze vector and the server(s) 112 may determine a false intersection location, despite the first gaze vector being associated with the first position separate from the second position associated with the second gaze vector. For example, FIG. 11C illustrates a first environment map 1104-1 including gaze vectors 1112, from which the server (s) 112 may generate a second environment map 1104-2 including a false intersection location 1130. The server(s) 112 may determine the false intersection location 1130 as an intersection between a second gaze vector 1112-2, a third gaze vector 1112-3 and a fifth gaze vector 1112-5. However, the second gaze vector 1112-2 may be associated with a point in Quadrant 4, the third gaze vector 1112-3 may be associated with a point in Quadrant 3 and the fifth gaze vector 1112-5 may be associated with a separate point in Quadrant 3. Thus, despite the gaze vectors 1112 being associated with different points in the panoramic image data, the server(s) 112 may determine the false intersection location 1130. In this example, as the second environment map 1102-2 approximates the panoramic image data extending along an exterior of the circle, the server(s) 112 may ignore the false intersection location 1130 as it does not correspond to the perimeter of the circle. However, in some examples the server(s) 112 may incorporate distance information and may not easily distinguish the false intersection location 1130 from a true intersection location.

While FIGS. 11A-11C are illustrated as two-dimensional environment maps, the disclosure is not limited thereto. Instead, the server(s) 112 may generate a three-dimensional environment map with three dimensional gaze vectors (e.g., x and y directions used in the two dimensional environment map along with a z direction indicating a height associated with the gaze). Using the three-dimensional environment map, the server(s) 112 may be more likely to identify the false intersection location 1130 as the gaze vectors need to intersect in three dimensions. For example, a first person may be looking at a tree branch of a tree while a second person may be looking at a base of the tree. Therefore, the server(s) 112 may determine that a first gaze vector and a second gaze vector may intersect in the two-dimensional environment map, but the first gaze vector is associated with a relatively high z value (e.g., corresponding to the tree branch) while the second gaze vector is associated with a relatively low z value (e.g., corresponding to the base of the tree). Thus, the server(s) 112 may determine that the first gaze vector and the second gaze vector do not intersect in the three-dimensional environment map. Further, using the three-dimensional environment map the server(s) 112 may crop the video data in a vertical direction when gazes intersect. For example, the server(s) 112 may crop (e.g., zoom) to include only a portion of the video data in the vertical direction, such as cropping the video data to include the tree branch without including the base of the tree.

Figure 12B:
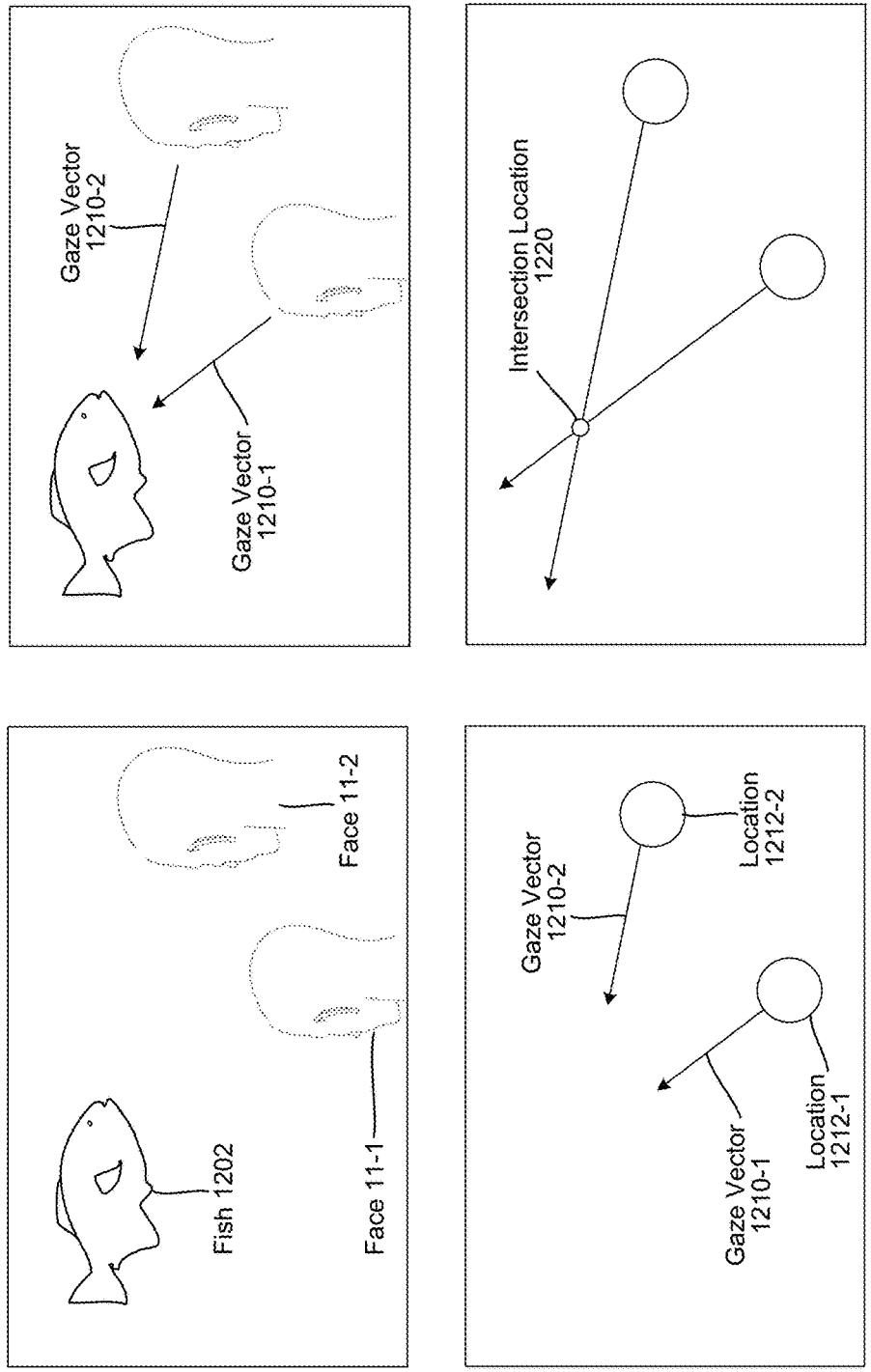

FIGS. 12A-12B illustrate an example of determining an area of interest using gaze vectors and distance information in an environment map according to embodiments of the present disclosure. In contrast to the environment maps illustrated in FIG. 11, the server(s) 112 may generate a first environment map 1200-1 using distance information, such that a panoramic image data is not associated with a perimeter of the first environment map 1200-1. Instead, objects in the panoramic image data may have individual locations (e.g., direction and distance) that the server(s) 112 may determine based on the panoramic image data, associated audio data, depth sensors, gyroscopic data or the like. For example, the server(s) 112 may determine that a first fish is a first distance from the image capture device 110 and a second fish is a second distance from the image capture device 110.

Similarly, the server(s) 112 may generate the first environment map 1200-1 using gaze vectors 1210 positioned using distance information. For example, a first gaze vector 1210-1 may be located at a first location (e.g., first direction and first distance relative to the image capture device 110), a second gaze vector 1210-2 may be located at a second location (e.g., second direction and second distance relative to the image capture device 110), a third gaze vector 1210-3 may be located at a third location (e.g., third direction and third distance relative to the image capture device 110), a fourth gaze vector 1210-4 may be located at a fourth location (e.g., fourth direction and fourth distance relative to the image capture device 110) and a fifth gaze vector 1210-5 may be located at a fifth location (e.g., fifth direction and fifth distance relative to the image capture device 110). Using the first environment map 1200-1 and the gaze vectors 1210, the server(s) 112 may determine an intersection location 1220 as illustrated in a second environment map 1200-2. The intersection location 1220 corresponds to an area of interest 1222 in the panoramic image data. In some examples, the server(s) 112 may determine the area of interest based on a direction associated with the intersection location 1220 (e.g., ignoring a distance from the intersection location 1220 and the image capture device 110). In other examples, the server(s) 112 may determine the area of interest based on the direction and the distance (e.g., the server(s) 112 determines the area of interest is associated with the whale shake in the foreground, not the fish in the background). Thus, the server(s) 112 may use the distance information to more precisely determine the intersection location 1220 within the second environment map 1200-2 and therefore more precisely determine the area of interest 1222 within the panoramic image data.

As discussed above, the server(s) 112 may store the gaze vectors, interesting areas and/or additional data associated with the interesting areas in video tags and/or annotation data associated with the video data. Thus, the server(s) 112 may use the interesting areas when generating video summarization or otherwise editing the video data to emphasize a portion of the panoramic video data.

Using distance information as illustrated in FIG. 12A, the server(s) 112 may generate the second environment map 1200-2 and determine an intersection location 1220 directly from the gaze vectors 1210. However, in some examples the server(s) 112 may not be able to directly determine the intersection location 1220. For example, the process of determining the intersection location 1220 may be inaccurate due to margins of error associated with the gaze vectors 1210. Additionally or alternatively, the server(s) 112 may not be able to differentiate between actual intersection locations and false intersection locations, or minute variations in position associated with the gaze vectors 1210 may result in imprecise intersection locations. In some examples, determining the gaze vectors 1210 in three dimensions may result in increased complexity and/or inaccuracy.

To conceptually illustrate how the server(s) 112 determine the intersection location 1220, FIG. 12B illustrates an example of a first face 11-1 and a second face 11-2, shown from behind. As illustrated in FIG. 12B, the first face 11-1 and the second face 11-2 are both looking at fish 1202. The server(s) 112 may determine that the gazes intersect by determining a first gaze vector 1210-1 associated with the first face 11-1 and a second gaze vector 1210-2 associated with the second face. Using the distance and direction information determined from the video data and/or additional sensor data, the server(s) 112 may determine a first location 1212-1 associated with the first face 11-1 and a second location 1212-2 associated with the second face 11-2. The first location and the second location may include two-dimensional or three-dimensional coordinates relative to the image capture device. The server(s) 112 may extrapolate the first gaze vector 1210-1 from the first location 1212-1 and the second gaze vector 1210-2 from the second location 1212-2 to determine an intersection point 1220. Using the intersection location 1220, the server(s) 112 may determine pixels in the video data that correspond to the fish 1202.

Figure 13A:
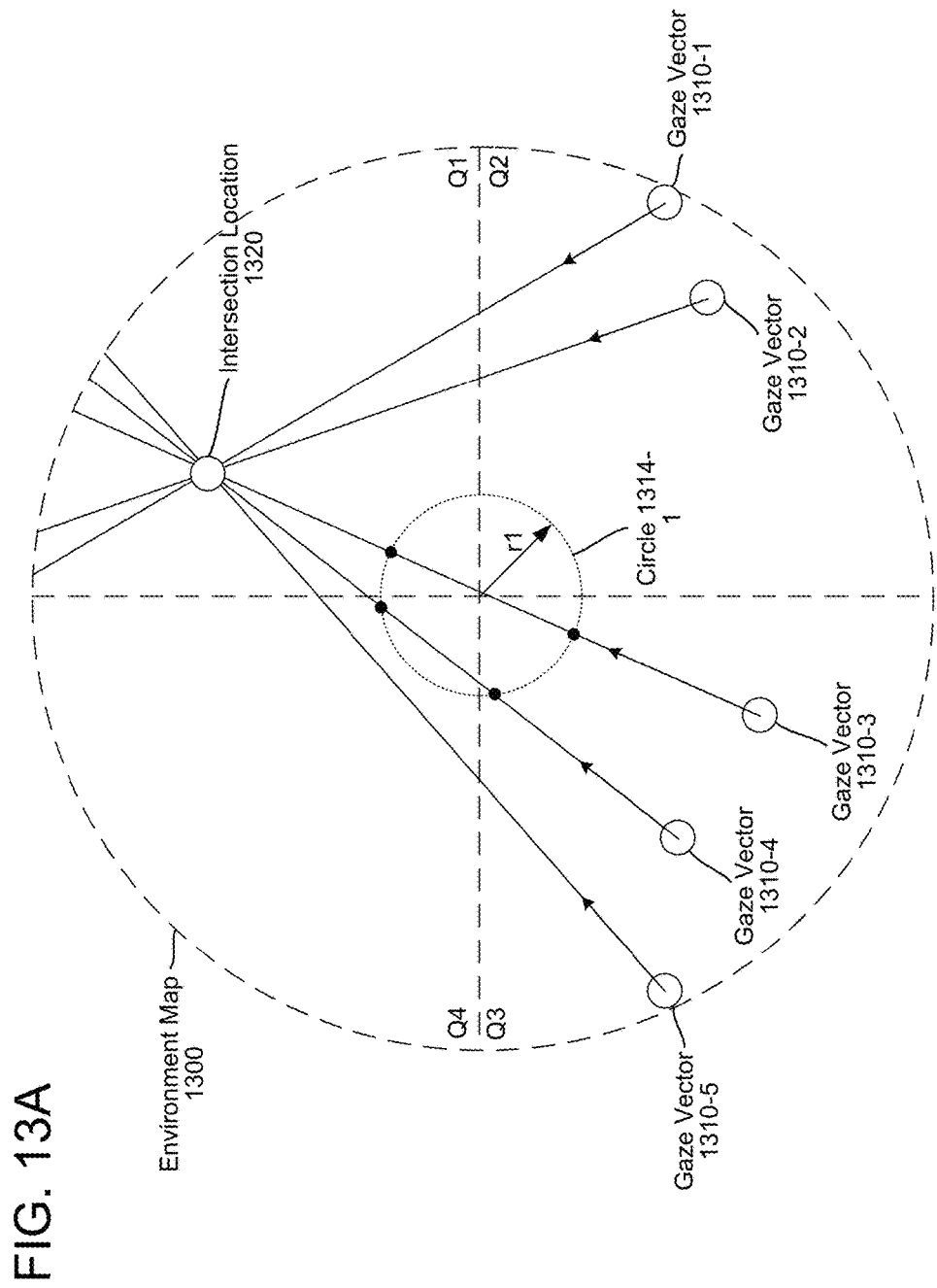
FIGS. 13A-13C illustrate examples of determining intersection locations using a sequence of circles according to embodiments of the present disclosure.
Figure 13B:
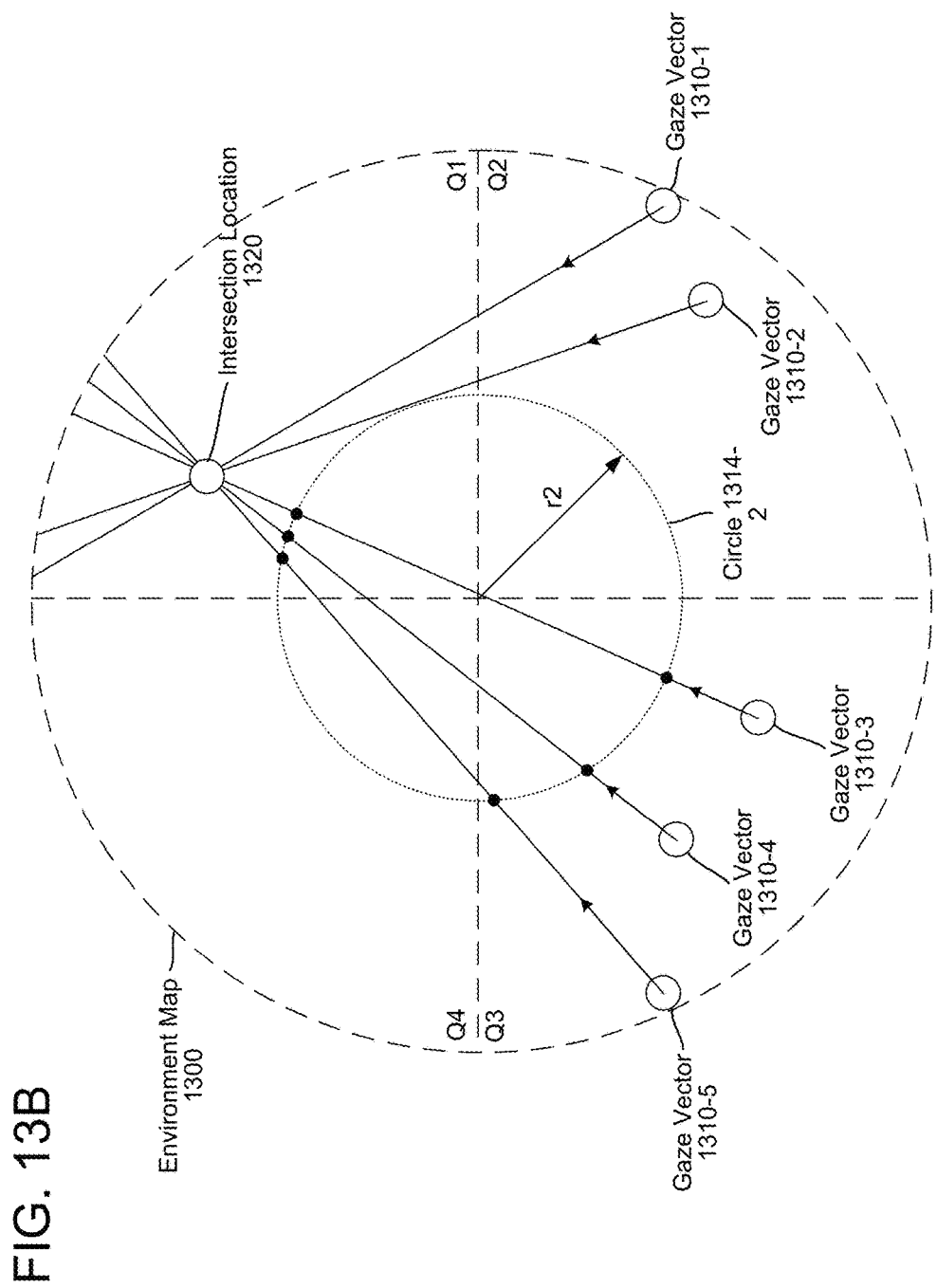
Figure 13C:
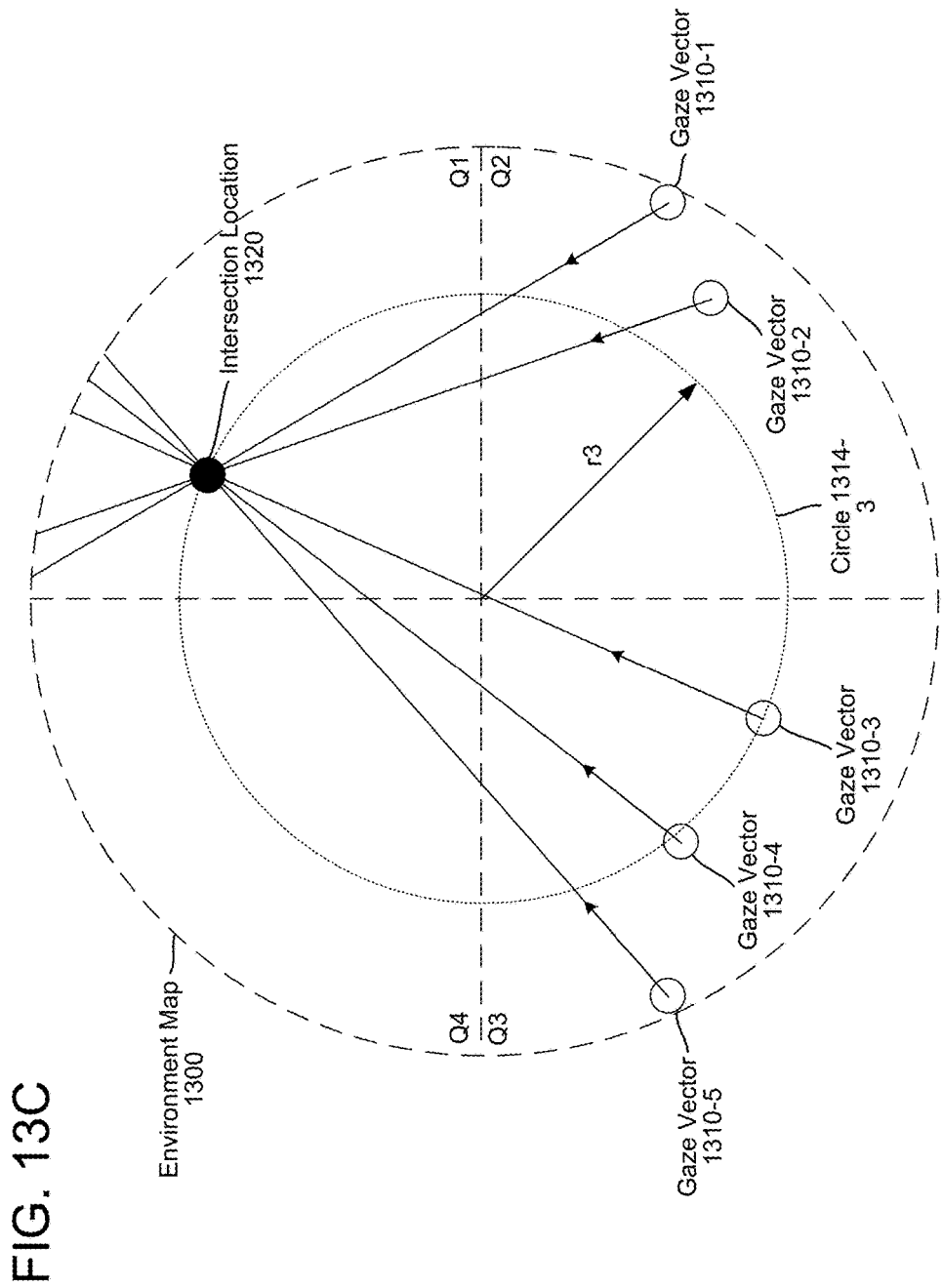

To improve an accuracy and/or leniency associated with determining the intersection location, the server(s) 112 may determine the intersection location using a series of circles (in two dimensions, spheres if the environment map is in three dimensions). For example, the server(s) 112 may generate a series of circles extending from the image capture device 110 to a perimeter of an environment map and may determine intersections between the gaze vectors and individual circles. If multiple intersections are within proximity (e.g., below a threshold), the server(s) 112 may determine an intersection location corresponding to the intersections. FIGS. 13A-13C illustrate examples of determining intersection locations using a sequence of circles according to embodiments of the present disclosure.

As illustrated in FIG. 13A, the server(s) 112 may generate an environment map 1300 including gaze vectors 1310 that converge at an intersection location 1320. While the intersection location 1320 is illustrated in the environment map 1300, the server(s) 112 are unaware of the intersection location 1320 and need to determine where the gaze vectors 1310 converge. To do this, the server(s) 112 generate a first circle 1314-1 having a first radius (r1), the first circle 1314-1 centered on the image capture device 110 (not shown, but inherently in a center of the environment map 1300). The server(s) 112 determine points at which the gaze vectors 1310 intersect the first circle 1314-1 and determines if the points are within proximity to each other (e.g., distance below a threshold). For example, the server(s) 112 may determine that a third gaze vector 1310-3 intersects the first circle 1314-1 at two locations and a fourth gaze vector 1310-4 intersects the first circle 1314-1 at two locations. The server(s) 112 may determine if the intersection points are within proximity to each other and therefore correspond to an intersection location. For example, the second intersection points of the third gaze vector 1310-3 and the fourth gaze vector 1310-4 are situated near each other, but not within proximity (e.g., distance exceeds the threshold).

In some examples, the server(s) 112 may estimate the intersection location 1320 based on the intersection points. For example, the third gaze vector 1310-3 and the fourth gaze vector 1310-4 each intersect the first circle 1314-1 twice. Therefore, the server(s) 112 may determine that a distance between the second intersection points is less than a distance between the first intersection points, indicating that the third gaze vector 1310-3 and the fourth gaze vector 1310-4 are converging. Thus, the server(s) 112 may determine that the intersection location 1320 is further than the first radius at an angle between a first angle of the second intersection point associated with the third gaze vector 1310-3 and a second angle of the second intersection point associated with the fourth gaze vector 1310-4.

As illustrated in FIG. 13B, the server(s) 112 may generate a second circle 1314-2 having a second radius (r2), the second circle 1314-2 centered on the image capture device 110. The server(s) 112 determine points at which the gaze vectors 1310 intersect the second circle 1314-2 and determines if the points are within proximity to each other (e.g., distance below a threshold). For example, the server(s) 112 may determine that the third gaze vector 1310-3 intersects the second circle 1314-2 at two locations, the fourth gaze vector 1310-4 intersects the second circle 1314-2 at two locations and a fifth gaze vector 1310-5 intersects the second circle 1314-2 at two locations. The server(s) 112 may determine if the intersection points are within proximity to each other and therefore correspond to the intersection location 1320. For example, the second intersection points of the third gaze vector 1310-3, the fourth gaze vector 1310-4 and the fifth gaze vector 1310-5 are situated near each other, but not within proximity (e.g., distance exceeds the threshold).

In some examples, the server(s) 112 may determine that at least two of the second intersection points are within proximity (e.g., distance below the threshold), but that the gaze vectors 1310 are converging and therefore the intersection location 1320 is further away.

As illustrated in FIG. 13C, the server(s) 112 may generate a third circle 1314-3 having a third radius (r3), the third circle 1314-3 centered on the image capture device 110. The server(s) 112 determine points at which the gaze vectors 1310 intersect the third circle 1314-3 and determines if the points are within proximity to each other (e.g., distance below a threshold). For example, the server(s) 112 may determine that each of the gaze vectors 1310 intersect the third circle 1314-3 at two locations. The server(s) 112 may determine if the intersection points are within proximity to each other and therefore correspond to the intersection location 1320. For example, the second intersection points of the gaze vectors 1310 are situated near each other, within proximity (e.g., distance is below the threshold). Therefore, the server(s) 112 may determine the intersection location 1320 based on the second intersection points of the gaze vectors 1310.

While FIG. 13C illustrates the second intersection points converging on a single intersection location, the present disclosure is not limited thereto. Instead, the second intersection points may vary within a range of points along the third circle 1314-3. In some examples, the server(s) 112 may determine the intersection location 1320 by averaging or approximating the second intersection points to determine an approximate center point. Additionally or alternatively, the server(s) 112 may determine the intersection location 1320 as including a range of locations, including each of the second intersection positions within proximity. Therefore, the intersection location 1320 may correspond with a larger area of interest in the panoramic video data.

While FIG. 13C illustrates a single intersection location 1320, the present disclosure is not limited thereto. Instead, the server(s) 112 may determine multiple intersection locations 1320, including circles having different radiuses and/or gaze vectors 1310 associated with multiple intersection locations. For example, the first gaze vector 1310-1 may be associated with a first point corresponding to the intersection location 1320 but may intersect another gaze vector 1310 at a second point corresponding to a false intersection location. The server(s) 112 may determine candidate intersection locations and perform additional processing to remove false intersection locations.

Figure 14:
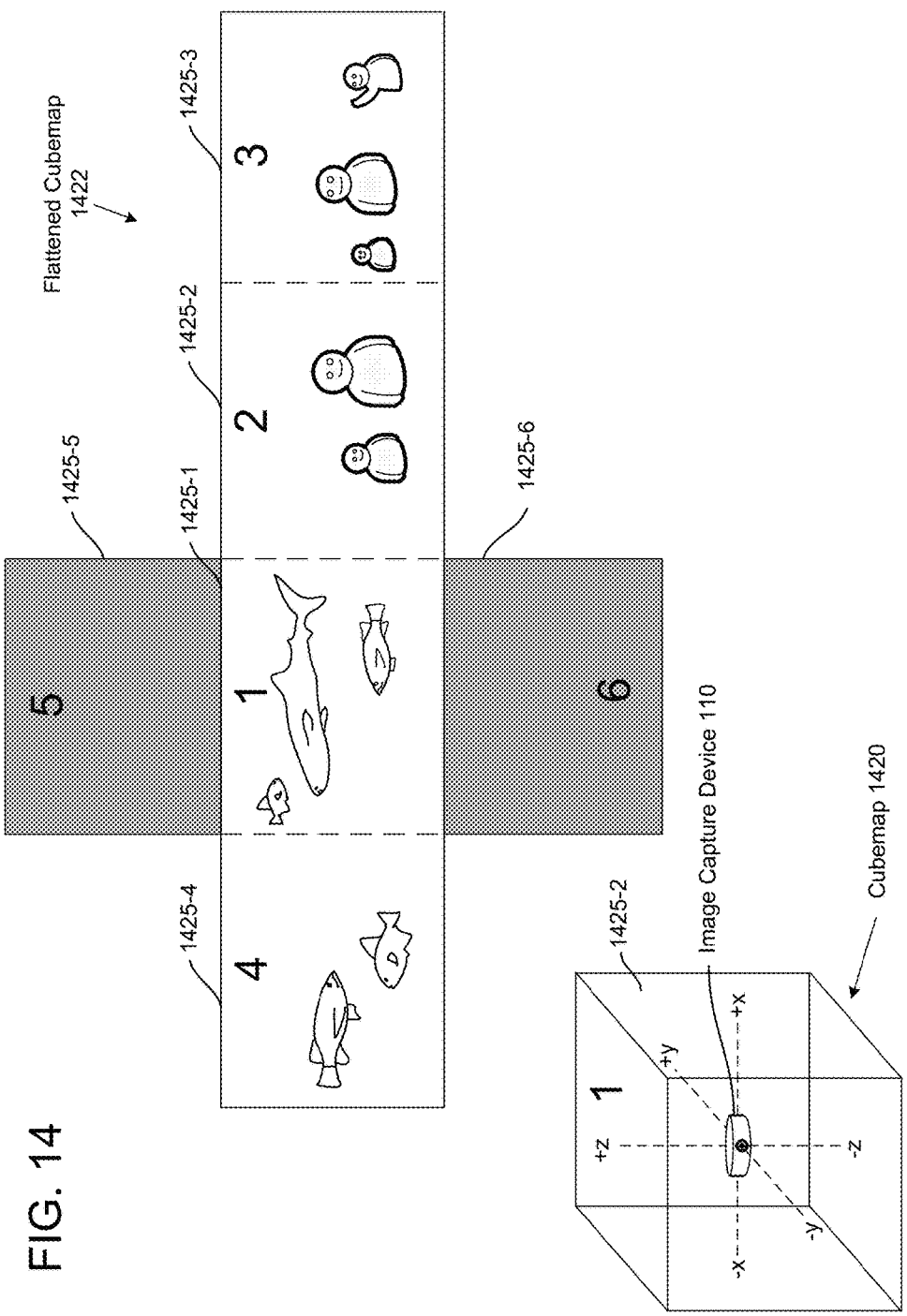
FIG. 14 illustrates an example of generating a cubemap according to embodiments of the present disclosure.

FIG. 14 illustrates an example of generating a cubemap according to embodiments of the present disclosure. Using techniques similar to those discussed above with regard to a circular environment map, the server(s) 112 may generate a cubemap 1420 using three dimensional data. Thus, instead of the panoramic image data extending around a perimeter of a circle, the cubemap 1420 extends the panoramic image data around a perimeter of a cube. For example, a flattened cubemap 1422 includes six sections, four of the sections (e.g., 1425-1 through 1425-4) corresponding to the four quadrants and the remaining two sections (e.g., 1425-5 and 1425-6) corresponding to a top and a bottom. While FIG. 14 illustrates the top section 1425-5 and the bottom section 1425-6 as blank, the disclosure is not limited thereto and portions of the panoramic image data may extend into the top section 1425-5 and the bottom section 1425-6. While FIG. 14 illustrates a three-dimensional spatial model being represented by a cubemap, the disclosure is not limited thereto and the spatial model may be represented by a spherical environment map without departing from the disclosure.

Figure 15:
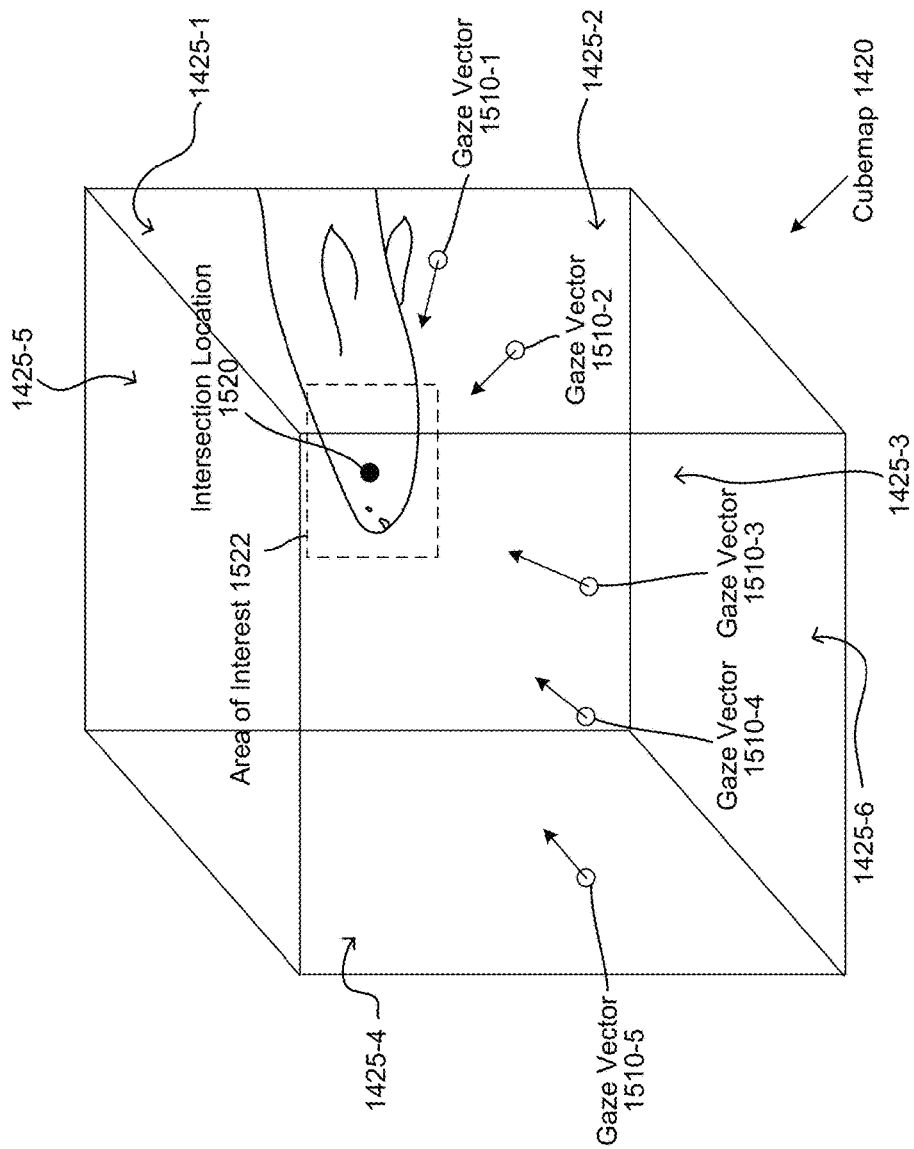
FIG. 15 illustrates an example of determining an area of interest using gaze vectors in a cubemap according to embodiments of the present disclosure.

The flattened cubemap 1422 may be folded to form the cubemap 1420. Thus, the sections (1425-1 to 1425-6) may be digitally manipulated to face a center of the cubemap 1420, similar to the first section 1425-1 shown within the cubemap 1420. The image capture device 110 is illustrated in the center of the cubemap 1420 along with axis lines showing an orientation of the image capture device 110 relative to the cubemap 1420. Using techniques similar to those discussed above, the server(s) 112 may determine an intersection location and/or area of interest based on gaze vectors and the cubemap 1420. FIG. 15 illustrates an example of determining an area of interest using gaze vectors in a cubemap according to embodiments of the present disclosure. As illustrated in FIG. 15, gaze vectors 1510 may be situated in the cubemap 1420 and the server(s) 112 may determine an intersection location 1520 associated with the gaze vectors 1510. The server(s) 112 may determine an area of interest 1522 corresponding to the intersection location 1520. For example, the intersection location 1520 is illustrated as being along a first section 1425-1, which corresponds to Quadrant 1 of the panoramic image data. Based on a size of the intersection location 1520, the server(s) 112 may determine a size of the area of interest 1522 included in Quadrant 1.

While FIG. 15 illustrates the gaze vectors 1510 located along a perimeter of the cubemap 1420, the present disclosure is not limited thereto. Instead, the gaze vectors 1510 may be located within the cubemap 1420 based on distance information, as discussed above with regard to FIG. 12A. Similarly, while FIG. 15 illustrates the intersection location 1520 and area of interest 1522 along the perimeter of the cubemap 1420, the present disclosure is not limited thereto and the intersection location 1520 and/or the area of interest 1522 may be located within the cubemap 1420. In addition, the server(s) 112 may determine the intersection location 1520 using techniques similar to those discussed above with regard to FIGS. 13A-13C, using a series of spheres instead of circles.

While several examples have been illustrated using two dimensions, the techniques may easily be modified to include three dimensions. For example, while the intersection location 1520 may be determined using three dimensional gaze vectors 1510, the area of interest 1522 in the panoramic image data may use the same direction (e.g., horizontal coordinates) but shift vertically based on the third dimension (e.g., vary vertical coordinates). Additionally or alternatively, the server(s) 112 may use three-dimensional gaze vectors to determine the intersection location 1520 in three dimensions.

The device 104 may not have enough information to create an ideal cubemap and the server(s) 112 may generate an incomplete cubemap with errors or inconsistencies due to optical aberrations, distortion, other imperfections, lack of information, obstructions, etc. For example, people or other objects may be present in the cubemap as an obstruction, blocking the image capture device 110 from viewing a portion of the surroundings. Despite these errors and/or inconsistencies, the server(s) 112 may use the incomplete cubemap to approximate the surroundings and may include additional steps to increase a precision of calculations involving the incomplete cubemap. For example, the server(s) 112 may determine if errors and/or inconsistencies exceed a threshold and may use previous or subsequent video data to provide more image information.

Figure 16:
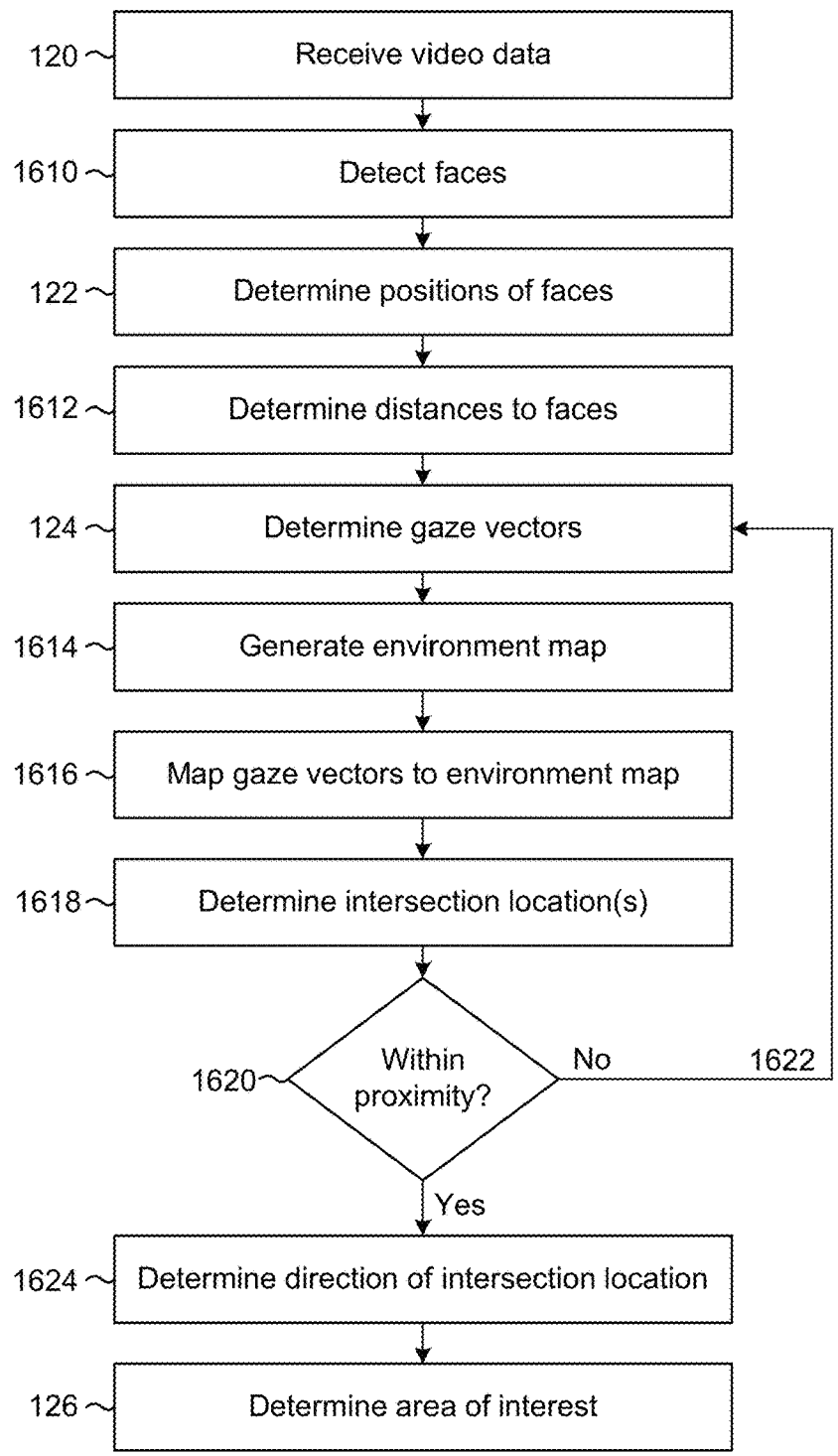
FIG. 16 is a flowchart conceptually illustrating an example method for determining an area of interest according to embodiments of the present disclosure.

FIG. 16 is a flowchart conceptually illustrating an example method for determining an area of interest according to embodiments of the present disclosure. As illustrated in FIG. 16, the server(s) 112 may receive (120) video data captured by the image capture device 110. The video data may be panoramic video data having a field of view beyond 180 degrees, which corresponds to video data with an aspect ratio greater than 2:1. However, while panoramic video data is more likely to include enough video data to determine an intersection location, the present disclosure is not limited thereto and the video data may have any field of view and/or aspect ratio.

The server(s) 112 may detect (1610) faces, represented in the video data determine (122) positions of the faces and determine (1612) distances to the faces. For example, the server(s) 112 may use facial recognition to identify faces, may identify head and shoulders to estimate positions of faces or may identify faces using other techniques known to one of skill in the art. The server(s) 112 may determine the positions of the faces using the video data (e.g., pixel coordinates associated with the faces and/or a direction of the pixel coordinates relative to the image capture device 110). The server(s) 112 may determine the distances using depth sensors, audio data, stereoscopic image data (e.g., overlap regions between multiple cameras 115) and/or a relative size of the face/head represented in the video data. The server(s) 112 may confirm distance estimates and/or establish a baseline estimate using two or more of the techniques described above. For example, the server(s) 112 may determine a distance to a face using a first technique (e.g., audio data) and use the distance to improve an accuracy of a second technique (e.g., relative size of the face/head represented in the video data). The server(s) 112 may determine (124) gaze vectors, which include at least a direction associated with the face. For example, the gaze vectors may indicate a direction that the face is pointing (e.g., a gaze vector aligned with a front of the face) or a direction that the face is viewing (e.g., a gaze vector determined based on an eye position relative to the face). By associating the gaze vector with the location, the server(s) 112 may determine an area of interest with greater accuracy and/or precision.

The server(s) 112 may generate (1614) an environment map approximating an environment around the image capture device 110 using the video data. In some examples the environment map may be two dimensional (e.g., approximating the environment without regard to a vertical z axis), although the present disclosure is not limited thereto and the environment map may be three dimensional. In some examples the environment map may approximate the environment by omitting distance information (e.g., placing the video data at an equal distance throughout the environment map), although the present disclosure is not limited thereto and the environment map may include distance information associated with objects represented in the video data. In some examples the environment map may be circular in shape (e.g., the video data is manipulated to surround the image capture device 110 in a circle or sphere), although the present disclosure is not limited thereto and the environment map may be square or cube in shape (e.g., a cubemap where the video data is manipulated to form the faces of a cube).

The server(s) 112 may map (1616) the gaze vectors to the environment map and determine (1618) intersection location(s) and determine (1620) if the intersection location(s) are within proximity (e.g., distance below a threshold). For example, the server(s) 112 may determine multiple intersection locations (e.g., first intersection location between a first gaze vector and a second gaze vector, second intersection location between the first gaze vector and a third gaze vector, etc.) and may determine that the multiple intersection locations are within proximity to each other. As a result, the server(s) 112 may determine a single intersection location associated with the multiple intersection locations (e.g., area including the first intersection location, the second intersection location, etc.). The server(s) 112 may determine the intersection location(s) in step 1618 for a discrete point in time (e.g., a single video frame), a duration of time (e.g., within several seconds/minutes) or the like. In some examples, the server(s) 112 may generate the environment map at a first time (with first gaze vectors) and may reuse the environment map, updating current locations of faces represented in the video data or the like, at a second time (with second gaze vectors).

In some examples, the server(s) 112 may determine multiple distances and/or multiple gaze vectors associated with a face and may use combinations of the multiple distances and/or multiple gaze vectors to determine the area of interest. For example, the server(s) 112 may determine distance information based on certain assumptions, such as when using a relative size of the face represented in the video data. While a relative size of the face changes based on distance, a first face may have a different size than a second face. For example, a child may have a relatively smaller size than an adult. Therefore, the server(s) 112 may determine multiple distances based on varying assumptions of the size of the face. For example, a large face (e.g., an adult) may correspond to a first distance, a medium face may correspond to a second distance (e.g., closer than the first distance) and a small face (e.g., a child) may correspond to a third distance (e.g., closer than the second distance). The server(s) 112 may determine the three distances and may run simulations/calculations using the gaze vector positioned at each of the three distances. The server(s) 112 may determine a large number of potential intersection points using the combination of multiple distances and/or multiple gaze vectors for each face represented in the video data and may determine a small number of likely potential intersection points.

If the server(s) 112 do not determine that the intersection location(s) are within proximity, the server(s) 112 may loop (1622) to step 124. If the server(s) 112 determine that the intersection location(s) are within proximity, the server(s) 112 may determine (1624) a direction associated with the intersection location. For example, the server(s) 112 may use geometry to determine the intersection location between two or more gaze vectors and to determine the direction associated with the intersection location, the direction relative to a fixed location on the image capture device. Additionally or alternatively, the server(s) 112 may generate a series of circles (in two dimensions, spheres in three dimensions) to determine the intersection location. The server(s) 112 may determine (126) an area of interest corresponding to pixels in the video data based on the direction. A size of the area of interest may correspond to a size of the intersection location and/or a distance between multiple intersection locations. In some examples, the server(s) 112 may determine the size of the area of interest based on an object included in the area of interest. For example, if the area of interest is a portion of an object (e.g., a nose of a whale shark), the server(s) 112 may determine that the size of the area of interest should include more of the object (e.g., a front half of the whale shark, an entirety of the whale shark, etc.). Thus, the server(s) 112 may determine a level of zoom or cropping that corresponds to the area of interest.

While examples have described mapping the gaze vectors to an environment map, the disclosure is not limited thereto. Instead, the server(s) 112 may determine the intersection locations and/or area of interest using calculations without explicitly generating the environment map. For example, the server(s) 112 may determine a first gaze vector originating at a first location, determine a second gaze vector originating at a second location and determine an intersection location between the first gaze vector and the second gaze vector directly using equations/calculations (e.g., using polar or spherical coordinates).

After determining the area of interest, the server(s) 112 may store the area of interest, the intersection location, the direction, the gaze vectors and/or other gaze data in annotation data associated with individual video frames or in video tags, which are data structures that include information. The server(s) 112 may use the annotation data and/or video tags to generate a video summarization of the video data. For example, the video summarization may summarize lengthy video data (e.g., an hour of recording) in a short video summary (e.g., 2-5 minutes) highlighting the interesting events that occurred in the video data. Therefore, each video clip in the video summary may be relatively short (e.g., between 5-60 seconds) and the portion of the video data included in the video clip may be determined based on the areas of interest determined in step 126. Additionally or alternatively, the server(s) 112 and/or the device 102 may use the area of interest, the intersection location, the direction, the gaze vectors and/or other gaze data to provide additional functionality in a user interface when a user is editing video data. Thus, the device 102 may display a user interface for video editing that includes suggested directions/regions of interest based on the area of interest. For example, if the server(s) 112 determine that an area of interest corresponds to a first direction of 90 degrees approximately one minute into video data, the device 102 may display the video data and display an icon or other indication about one minute into the video data indicating to the user that the first direction of 90 degrees may include an area of interest.

Figure 17:
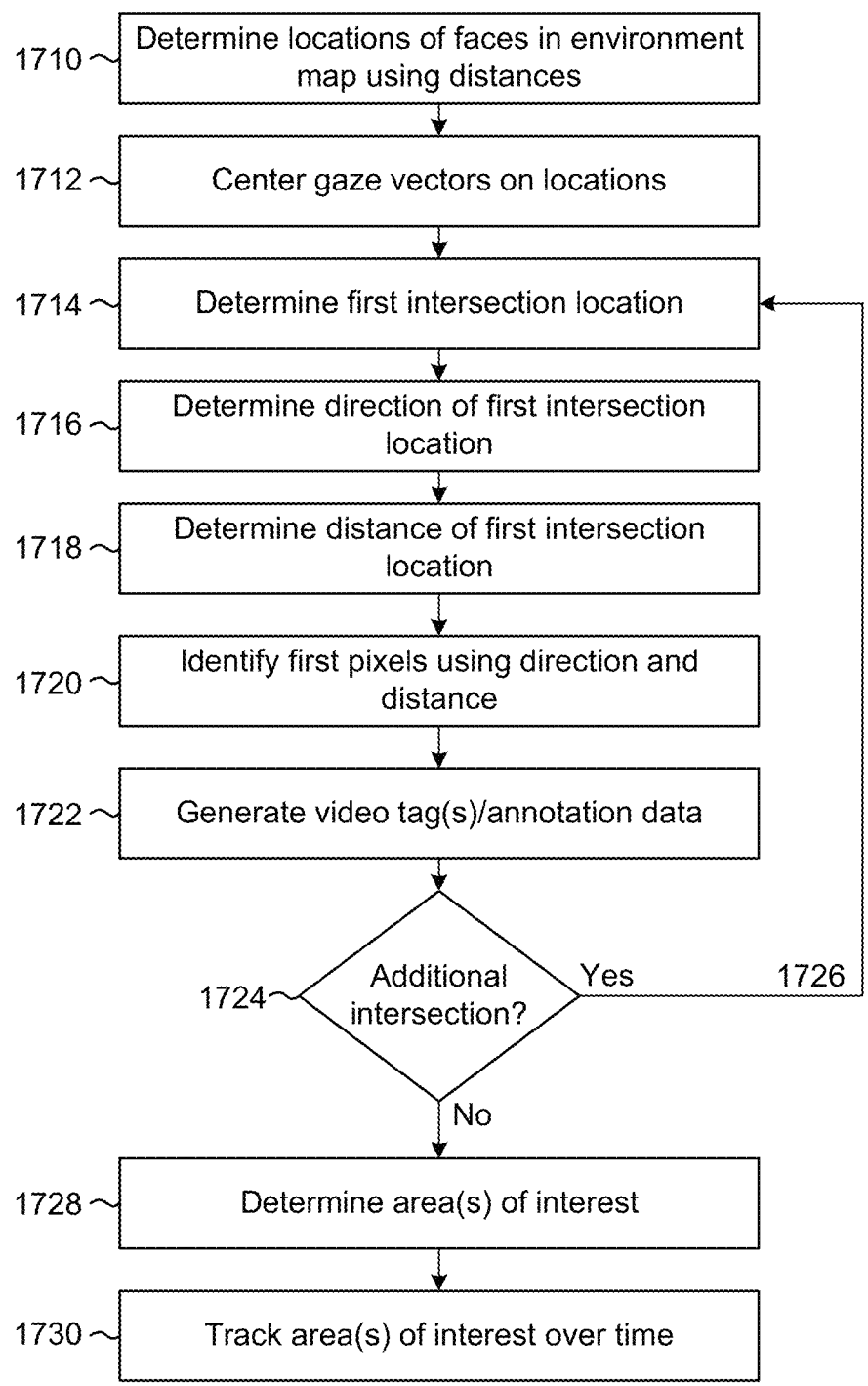
FIG. 17 is a flowchart conceptually illustrating an example method for tracking areas of interest over time according to embodiments of the present disclosure.

FIG. 17 is a flowchart conceptually illustrating an example method for tracking areas of interest over time according to embodiments of the present disclosure. As illustrated in FIG. 17, the server(s) 112 may determine (1710) locations of faces in an environment map using distances and may center (1712) gaze vectors on the locations. The server(s) 112 may determine (1714) a first intersection location, determine (1716) a direction of the first intersection location, may determine (1718) a distance associated with the first intersection location, identify (1720) first pixels in the video data using the direction and the distance and may generate (1722) video tag(s) and/or annotation data including the first pixels, the gaze vectors, the first intersection location, the direction, the distance and/or other gaze data associated with the first intersection location. The server(s) 112 may determine (1724) if there is an additional intersection location. If so, the server(s) 112 may loop (1726) to step 1714 and repeat steps 1714-1724. If not, the server(s) 112 may determine (1728) area(s) of interest using the video tag(s)/annotation data.

In some examples, the server(s) 112 may use the environment map and the gaze vectors to identify pairwise combinations of the gaze vectors. For example, the server(s) 112 may determine a first location where a first gaze vector and a second gaze vector intersect, a second location where the first gaze vector and a third gaze vector intersect and a third location where the second gaze vector and the third gaze vector intersect. Thus, the server(s) 112 may generate a cluster map using every combination of gaze vectors and may determine if the intersection locations are highly clustered in particular areas. As discussed in greater detail above, in some examples the server(s) 112 may generate multiple gaze vectors (e.g., a first gaze vector using eye tracking, a second gaze vector using head tracking, etc.) and/or multiple distances (e.g., first distance assuming the face is large, second distance assuming the face is small, etc.) for each face. Thus, the server(s) 112 may identify pairwise combinations using each of the multiple gaze vectors and/or the multiple distances to generate the cluster map.

The server(s) 112 may track (1730) the area(s) of interest over a period of time. For example, the server(s) 112 may generate a heat map indicating the area(s) of interest over the period of time. Additionally or alternatively, the server(s) 112 may generate individual heat maps associated with gaze vectors associated with individual faces over the period of time.

Figure 18:
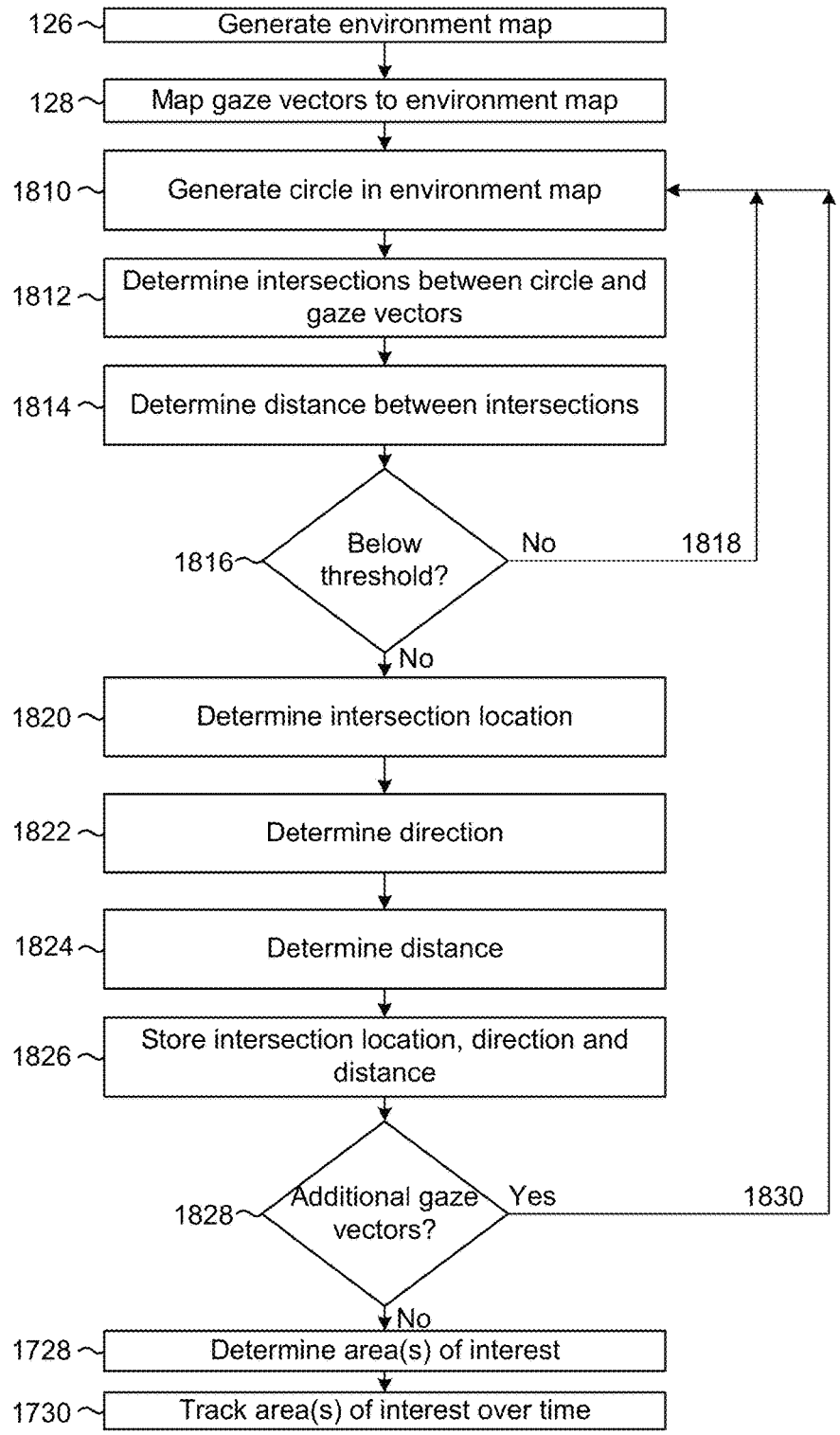
FIG. 18 is a flowchart conceptually illustrating an example method for determining intersection locations using a sequence of circles according to embodiments of the present disclosure.

FIG. 18 is a flowchart conceptually illustrating an example method for determining intersection locations using a sequence of circles according to embodiments of the present disclosure. As illustrated in FIG. 18, the server(s) 112 may generate (126) an environment map and map (128) gaze vectors to the environment map. The server(s) 112 may generate (1810) a circle in the environment map (when the environment map is two-dimensional, a sphere when the environment map is three-dimensional), determine (1812) intersections between the circle and gaze vectors, determine (1814) a distance between intersections and determine (1816) if the distance is below a threshold. If the distance is not below the threshold, the server(s) 112 may loop (1818) to step 1810 and repeat steps 1810-1816. If the distance is below the threshold, the server(s) 112 may determine (1820) an intersection location, determine (1822) a direction, determine (1824) a distance and store (1826) the intersection location, the direction and/or the distance in video tag(s) and/or annotation data.

The server(s) 112 may determine (1828) if there are additional gaze vectors. If there are, the server(s) 112 may loop (1830) to step 1810 and repeat steps 1810-1828. If there aren't, the server(s) 112 may determine (1728) area(s) of interest and track (1730) area(s) of interest over time, as discussed in greater detail above.

Figure 19:
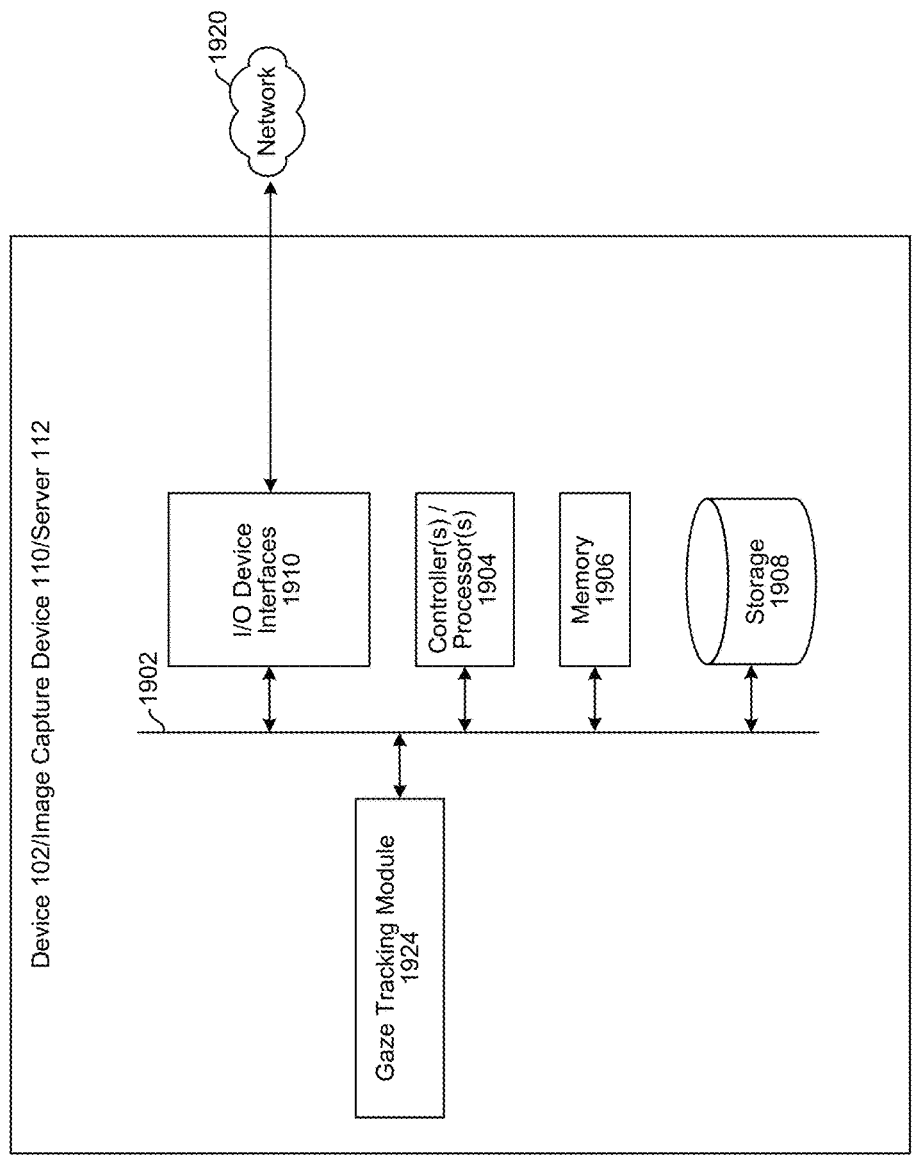
FIG. 19 is a block diagram conceptually illustrating example components of a system according to embodiments of the present disclosure.

FIG. 19 illustrates a block diagram conceptually illustrating example components of a system 100 including one or more of a device 102, an image capture device 110 and/or a server(s) 112. Depending upon how the system is structured, some of the components illustrated in FIG. 19 as part of the device 102, the image capture device 110 or the server(s) 112 may be included only in the device 102, the image capture device 110 or in the server(s) 112, or may be distributed across multiple devices 102, image capture devices 110 and/or servers 112. Other components not illustrated may also be included in the device 102, the image capture device 110 and/or the server(s) 112. In operation, the system 100 may include computer-readable and computer-executable instructions that reside in storage 1908 on the device 102/image capture device 110/server(s) 112. The device 102/image capture device 110/server(s) 112 may be an electronic device capable of performing video processing. Examples of electronic devices may include computers (e.g., a desktop, a laptop, a server or the like), portable devices (e.g., a camera (such as a 360° video camera), smart phone, tablet or the like), media devices (e.g., televisions, video game consoles or the like) or the like. The device 102/image capture device 110/server(s) 112 may also be a component of any of the abovementioned devices or systems.

As illustrated in FIG. 19, the device 102/image capture device 110/server(s) 112 may include an address/data bus 1902 for conveying data among components of the device 102/image capture device 110/server(s) 112. Each component within the device 102/image capture device 110/server(s) 112 may also be directly connected to other components in addition to (or instead of) being connected to other components across the bus 1902.

The device 102/image capture device 110/server(s) 112 may include one or more controllers/processors 1904 comprising one-or-more central processing units (CPUs) for processing data and computer-readable instructions and a memory 1906 for storing data and instructions. The memory 1906 may include volatile random access memory (RAM), non-volatile read only memory (ROM), non-volatile magnetoresistive (MRAM) and/or other types of memory. The device 102/image capture device 110/server(s) 112 may also include a data storage component 1908 for storing data and processor-executable instructions. The data storage component 1908 may include one or more non-volatile storage types such as magnetic storage, optical storage, solid-state storage, etc. The device 102/image capture device 110/server(s) 112 may also be connected to a removable or external non-volatile memory and/or storage (such as a removable memory card, memory key drive, networked storage, etc.) through the input/output device interfaces 1910.

The device 102/image capture device 110/server(s) 112 includes input/output device interfaces 1910. A variety of components may be connected to the device 102/image capture device 110/server(s) 112 through the input/output device interfaces 1910, such as camera(s) 115 and microphone(s) 116. However, the disclosure is not limited thereto and the device 102/image capture device 110/server(s) 112 may not include an integrated camera or microphone. Thus, the camera(s) 115, microphone(s) 116 and/or other components may be integrated into the device 102/image capture device 110/server(s) 112 or may be separate without departing from the disclosure.

The input/output device interfaces 1910 may be configured to operate with a network 1920, for example a wireless local area network (WLAN) (such as WiFi), Bluetooth®, ZigBee® and/or wireless networks, such as a Long Term Evolution (LTE) network, WiMAX™ network, 3G network, etc. The network 1920 may include a local or private network or may include a wide network such as the internet. Devices may be connected to the network 1920 through either wired or wireless connections.

The input/output device interfaces 1910 may also include an interface for an external peripheral device connection such as universal serial bus (USB), FireWire, Thunderbolt, Ethernet port or other connection protocol that may connect to networks 1920. The input/output device interfaces 1910 may also include a connection to an antenna (not shown) to connect one or more networks 1920 via a wireless local area network (WLAN) (such as WiFi) radio, Bluetooth®, and/or wireless network radio, such as a radio capable of communication with a wireless communication network such as a Long Term Evolution (LTE) network, WiMAX™ network, 3G network, etc.

The device 102/image capture device 110/server(s) 112 further includes a gaze tracking module 1924, which may comprise processor-executable instructions stored in storage 1908 to be executed by controller(s)/processor(s) 1904 (e.g., software, firmware), hardware, or some combination thereof. For example, components of the gaze tracking module 1924 may be part of a software application running in the foreground and/or background on the device 102/image capture device 110/server(s) 112. The gaze tracking module 1924 may control the device 102/image capture device 110/server(s) 112 as discussed above, for example with regard to FIGS. 1, 16, 17 and/or 18. Some or all of the controllers/modules of the gaze tracking module 1924 may be executable instructions that may be embedded in hardware or firmware in addition to, or instead of, software. In one embodiment, the device 102/image capture device 110/server(s) 112 may operate using an Android® operating system (such as Android® 4.3 Jelly Bean, Android® 4.4 KitKat or the like), an Amazon® operating system (such as FireOS or the like), or any other suitable operating system.

Executable computer instructions for operating the device 102/image capture device 110/server(s) 112 and its various components may be executed by the controller(s)/processor(s) 1904, using the memory 1906 as temporary "working" storage at runtime. The executable instructions may be stored in a non-transitory manner in non-volatile memory 1906, storage 1908, or an external device. Alternatively, some or all of the executable instructions may be embedded in hardware or firmware in addition to or instead of software.

The components of the device(s) 102/image capture device 110/server(s) 112, as illustrated in FIG. 19, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

Figure 20:
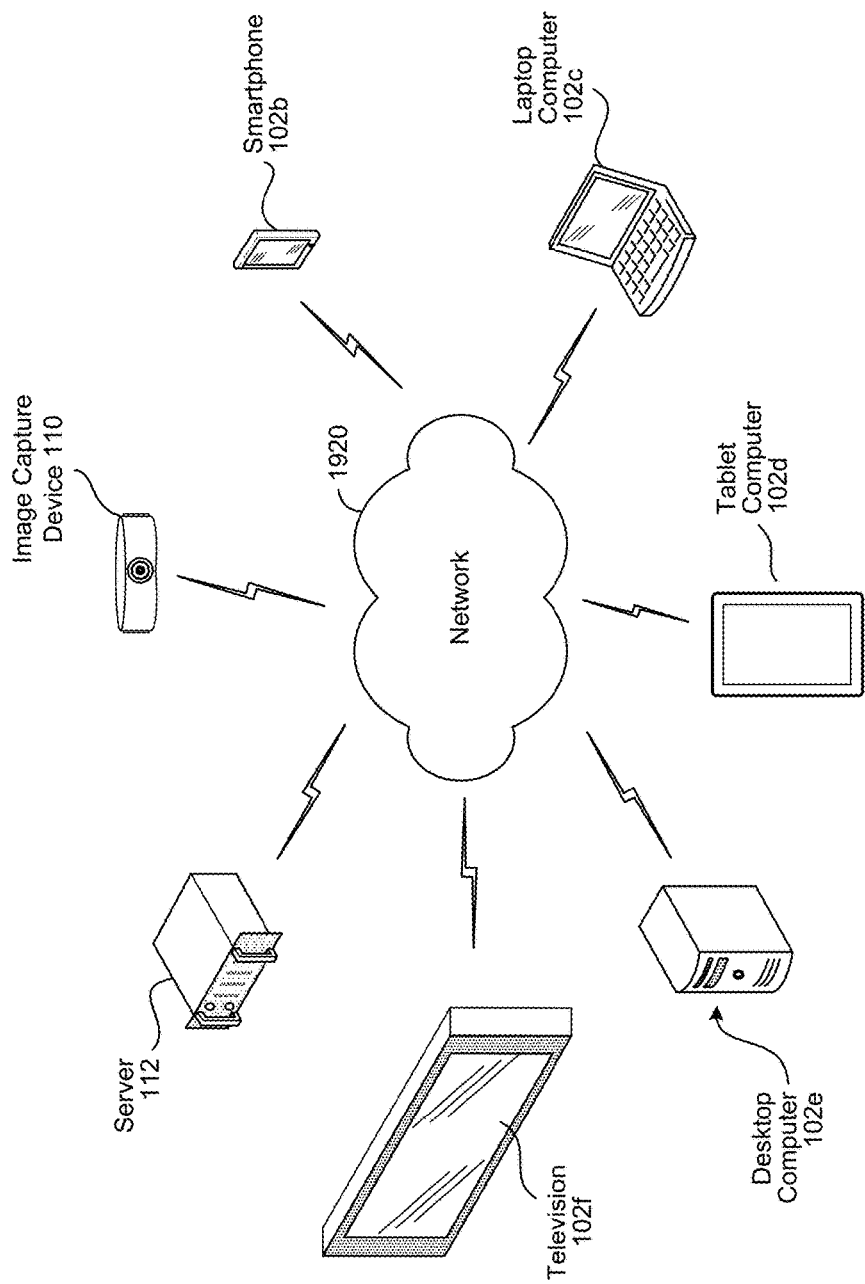
FIG. 20 illustrates an example of a computer network for use with the system.

As shown in FIG. 20, multiple devices may be connected over a network 1920. The network 1920 may include a local or private network or may include a wide network such as the internet. Devices may be connected to the network 1920 through either wired or wireless connections. For example, a smart phone 102b may be connected to the network 1920 through a wireless service provider. Other devices, such as an image capture device 110, laptop computer 102c, tablet computer 102d, desktop computer 102e, television 102f, and/or server(s) 112, may connect to the network 1920 through a wired connection. The server(s) 112 may be configured to receive, store, process and/or stream data related to image data and/or audio data associated with one or more of the image capture device 110, smartphone 102b, laptop computer 102c, tablet computer 102d, desktop computer 102e and television 102f, etc. For example, the server(s) 112 may perform any of the steps described above with regard to FIGS. 1, 16, 17 and/or 18. Alternatively, the server(s) 112 may receive and store data generated by the v image capture device 110, smartphone 102b, laptop computer 102c, tablet computer 102d, desktop computer 102e, television 102f, etc. using any of the steps described above. Thus, the sever 112 may process and output audio data, image data and/or video data to allow convenient access to any of the devices connected to the server(s) 112.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for determining an area of interest, the method comprising:
   receiving video data captured by an image capture device having a field of view of 360 degrees;
   determining a first position of a first head represented in the video data;
   estimating a first distance from the first head to the image capture device;
   determining a first location using the first position and the first distance, the first location corresponding to a location of the first head relative to the image capture device;
   determining a first vector describing at least a first direction from the first location, the first direction corresponding to where the first head is facing;
   determining a second position of a second head represented in the video data;
   estimating a second distance from the second head to the image capture device;
   determining a second location using the second position and the second distance, the second location corresponding to a location of the second head relative to the image capture device;
   determining a second vector describing at least a second direction from the second location, the second direction corresponding to where the second head is facing;
   generating an environment map using the video data, the environment map describing an environment of the image capture device visible in the video data;
   determining an intersection location, the intersection location corresponding to a location in the environment map at which the first vector and the second vector intersect;
   determining first pixels in the video data corresponding to the intersection location; and
   determining an area of interest including the first pixels.

2. The computer-implemented method of claim 1, wherein determining the intersection location further comprises:
   determining a threshold indicating proximity between two or more locations;
   generating a first sphere in the environment map centered on the image capture device, the first sphere having a first radius;
   determining a first location on the first sphere at which the first vector intersects the first sphere;
   determining a second location on the first sphere at which the second vector intersects the first sphere;
   determining that a third distance between the first location and the second location exceeds the threshold;
   generating a second sphere in the environment map centered on the image capture device, the second sphere having a second radius;
   determining a third location on the second sphere at which the first vector intersects the second sphere;
   determining a fourth location on the second sphere at which the second vector intersects the second sphere;
   determining that a fourth distance between the third location and the fourth location is below the threshold; and
   determining the intersection location using the third location and the fourth location, the intersection location having a fifth distance from the image capture device, the fifth distance being equal to the second radius.

3. The computer-implemented method of claim 1, wherein the determining the first vector further comprises:
   detecting the first head in the first image data using facial detection;
   determining an eye direction of a first eye of the first head; and
   determining the first vector using the eye direction.

4. The computer-implemented method of claim 1, further comprising:
   determining a third vector describing a third direction from the first location at a first time;
   determining a fourth vector describing a fourth direction from the second location at a second time after the first time;
   determining a second intersection location between the third vector and the fourth vector; and
   identifying second pixels in the video data corresponding to the second intersection location.

5. A computer-implemented method, comprising:
   receiving video data captured by an image capture device;
   determining a first position of a first head in the video data;
   determining a first vector describing a first direction from the first position, the first vector corresponding to a first gaze direction associated with the first head;

determining a second position of a second head in the video data;
determining a second vector describing a second direction from the second position, the second vector corresponding to a second gaze direction associated with the second head;
determining an intersection location corresponding to the first vector and the second vector; and
identifying first pixels in the video data corresponding to the intersection location.

6. The computer-implemented method of claim 5, wherein:
determining the intersection location further comprises:
determining a first location in an environment of the image capture device corresponding to the first position,
determining the first vector relative to the first location,
determining a second location in the environment corresponding to the second position,
determining the second vector relative to the second location, and
determining the intersection location using the first vector and the second vector; and
identifying the first pixels further comprises:
determining a direction of the intersection location relative to the image capture device, and
determining the first pixels corresponding to the direction.

7. The computer-implemented method of claim 6, wherein:
determining the first location further comprises:
determining a first direction relative to the image capture device using the first position,
estimating a first distance from the first head to the image capture device, and
determining the first location using the first distance and the first direction;
determining the second location further comprises:
determining a second direction relative to the image capture device using the second position,
estimating a second distance from the second head to the image capture device, and
determining the second location using the second distance and the second direction; and
identifying the first pixels further comprises:
determining a third distance associated with the intersection location, and
identifying the first pixels in the video data based on the third distance.

8. The computer-implemented method of claim 5, further comprising:
generating first image data from the video data, the video data having a field of view of 360 degrees; and
generating an environment map using the first image data, wherein:
determining the intersection location further comprises determining the intersection location using the environment map, and
identifying the first pixels further comprises:
identifying second pixels in the environment map corresponding to the intersection location, and
determining the first pixels in the video data corresponding to the second pixels.

9. The computer-implemented method of claim 8, wherein the determining the intersection location further comprises:

generating a first sphere in the environment map centered on the image capture device, the first sphere having a first radius;
determining a first location on the first sphere corresponding to the first vector intersecting the first sphere;
determining a second location on the first sphere corresponding to the second vector intersecting the first sphere;
determining that a first distance between the first location and the second location is less than a threshold;
determining the intersection location based on one of the first location or the second location, the intersection location having a second distance from the image capture device equal to the first radius.

10. The computer-implemented method of claim 5, wherein the determining the first vector further comprises:
generating first image data from the video data, the first image data representing the first head;
determining an eye position of a first eye of the first head; and
determining the first vector based on the eye position relative to the first head.

11. The computer-implemented method of claim 5, further comprising:
determining a third position of a third head in the video data;
determining a third vector describing a third direction from the third position, the third vector corresponding to a third gaze direction associated with the third head;
determining a second intersection location between the first vector and the third vector;
determining a third intersection location between the second vector and the third vector;
determining that a distance between the first intersection location and the third intersection location is below a threshold;
determining an area of interest including the first intersection location and the third intersection location; and
identifying second pixels in the video data corresponding to the area of interest.

12. The computer-implemented method of claim 5, further comprising:
determining a third vector describing a third direction from the first position at a first time;
determining a fourth vector describing a fourth direction from the second position at a second time after the first time;
determining a second intersection location between the third vector and the fourth vector; and
identifying second pixels in the video data corresponding to the second intersection location.

13. A system, comprising:
at least one processor;
a memory including instructions that, when be executed by the at least one processor, cause the device to perform:
receiving video data captured by an image capture device;
determining a first position of a first head in the video data;
determining a first vector describing a first direction from the first position, the first vector corresponding to a first gaze direction associated with the first head;
determining a second position of a second head in the video data;

determining a second vector describing a second direction from the second position, the second vector corresponding to a second gaze direction associated with the second head;
determining an intersection location corresponding to the first vector and the second vector; and
identifying first pixels in the video data corresponding to the intersection location.

14. The system of claim 13, wherein the memory further includes instructions that, when executed by the at least one processor, further cause the system to perform:
determining a first location in an environment of the image capture device corresponding to the first position;
determining the first vector relative to the first location;
determining a second location in the environment corresponding to the second position;
determining the second vector relative to the second location;
determining the intersection location using the first vector and the second vector;
determining a direction of the intersection location relative to the image capture device; and
determining the first pixels corresponding to the direction.

15. The system of claim 14, wherein the memory further includes instructions that, when executed by the at least one processor, further cause the system to perform:
determining a first direction relative to the image capture device using the first position;
estimating a first distance from the first head to the image capture device;
determining the first location using the first distance and the first direction;
determining a second direction relative to the image capture device using the second position;
estimating a second distance from the second head to the image capture device;
determining the second location using the second distance and the second direction;
determining a third distance associated with the intersection location; and
identifying the first pixels in the video data based on the third distance.

16. The system of claim 13, wherein the memory further includes instructions that, when executed by the at least one processor, further cause the system to perform:
generating first image data from the video data, the video data having a field of view of 360 degrees;
generating an environment map using the first image data;
determining the intersection location using the environment map;
identifying second pixels in the environment map corresponding to the intersection location; and
determining the first pixels in the video data corresponding to the second pixels.

17. The system of claim 16, wherein the memory further includes instructions that, when executed by the at least one processor, further cause the system to perform:
generating a first sphere in the environment map centered on the image capture device, the first sphere having a first radius;
determining a first location on the first sphere corresponding to the first vector intersecting the first sphere;
determining a second location on the first sphere corresponding to the second vector intersecting the first sphere;
determining that a first distance between the first location and the second location is below a threshold; and
determining the intersection location based on one of the first location or the second location, the intersection location having a second distance from the image capture device equal to the first radius.

18. The system of claim 13, wherein the memory further includes instructions that, when executed by the at least one processor, further configure the system to perform:
generating first image data from the video data, the first image data representing the first head;
determining an eye position of a first eye of the first head; and
determining the first vector based on the eye position relative to the first head.

19. The system of claim 13, wherein the memory further includes instructions that, when executed by the at least one processor, further cause the system to perform:
determining a third position of a third head in the video data;
determining a third vector describing a third direction from the third position, the third vector corresponding to a third gaze direction associated with the third head;
determining a second intersection location between the first vector and the third vector;
determining a third intersection location between the second vector and the third vector;
determining that a distance between the first intersection location and the third intersection location is below a threshold;
determining an area of interest including the first intersection location and the third intersection location; and
identifying second pixels in the video data corresponding to the area of interest.

20. The system of claim 13, wherein the memory further includes instructions that, when executed by the at least one processor, further cause the system to perform:
determining a third vector describing a third direction from the first position at a first time;
determining a fourth vector describing a fourth direction from the second position at a second time after the first time;
determining a second intersection location between the third vector and the fourth vector; and
identifying second pixels in the video data corresponding to the second intersection location.

21. The computer-implemented method of claim 5, further comprising:
generating an environment map using the video data, the environment map describing an environment of the image capture device visible in the video data.

22. The system of claim 13, wherein the memory further includes instructions that, when executed by the at least one processor, further cause the system to perform:
generating an environment map using the video data, the environment map describing an environment of the image capture device visible in the video data.

* * * * *